US010547362B2

(12) United States Patent
Varatharaajan et al.

(10) Patent No.: US 10,547,362 B2
(45) Date of Patent: Jan. 28, 2020

(54) BEAMFORMING CODEBOOK ADAPTION TO ANTENNA ARRAY IMPERFECTIONS

(71) Applicant: Fraunhofer-Gesellschaft zur Förderung der angewandten Forschung e.V., München (DE)

(72) Inventors: Sutharshun Varatharaajan, Ilmenau (DE); Markus Landmann, Zeitz (DE); Marcus Großmann, Friedrichroda (DE)

(73) Assignee: Fraunhofer-Gesellschaft zur Foerderung der angewandten Forschung e.V. (DE)

( * ) Notice: Subject to any disclaimer, the term of this patent is extended or adjusted under 35 U.S.C. 154(b) by 0 days.

(21) Appl. No.: 16/523,846

(22) Filed: Jul. 26, 2019

(65) Prior Publication Data
US 2019/0349045 A1 Nov. 14, 2019

Related U.S. Application Data

(63) Continuation of application No. PCT/EP2018/052561, filed on Feb. 1, 2018.

(30) Foreign Application Priority Data

Feb. 2, 2017 (EP) ..................... 17154486

(51) Int. Cl.
*H04B 7/04* (2017.01)
*H04B 7/0456* (2017.01)
(Continued)

(52) U.S. Cl.
CPC ......... *H04B 7/0482* (2013.01); *H01Q 3/2605* (2013.01); *H04B 7/0417* (2013.01);
(Continued)

(58) Field of Classification Search
CPC .. H04B 7/0482; H04B 7/0417; H04B 7/0469; H04B 7/0617
See application file for complete search history.

(56) References Cited

U.S. PATENT DOCUMENTS

2013/0077705 A1    3/2013  Thomas et al.
2015/0381247 A1*  12/2015  Ko .................. H04B 7/0456
                                                         370/329
(Continued)

FOREIGN PATENT DOCUMENTS

EP    3046271    7/2016
EP    3185454    6/2017
(Continued)

OTHER PUBLICATIONS

Andreas Richter: "Estimation of Radio Channel Parameters: Models and Algorithms," Doctoral thesis, Verlag ISLE, 2005. (ISBN: 3-938843-02-0).
Bialkowski, M. et al.: "Effect of Mutual Coupling on the Interference Rejection Capabilities of Linear and Circular Arrays in CDMA Systems"; IEEE Transactions on Antennas and.
Baxter et al.: "An experimental study of antenna array calibration", IEEE Transactions on Antennas and Propagation, vol. 51, No. 3, Mar. 1, 2003, pp. 664-667, XP011096820, I.
(Continued)

*Primary Examiner* — Kabir A Timory
(74) *Attorney, Agent, or Firm* — Haynes and Boone, LLP

(57) ABSTRACT

A transmitter includes an antenna array having a plurality of antennas for a wireless communication with one or more receivers, and a precoder connected to the antenna array. The precoder applies a set of beamforming weights to the antenna array. The set of beamforming weights is selected from a codebook to transmit/receive beams or nulls pointing in selected directions. The codebook includes sets of beamforming weights for a plurality of directions. The beamforming weights are based on a first antenna array response matrix defined by a second antenna array response matrix and one or more transformation matrices. The first antenna array response matrix contains first array response vectors of the antenna array, the second antenna array response matrix contains second array response vectors determined using a
(Continued)

model of the antenna array. The transformation matrices describe one or more characteristics of the antenna array.

24 Claims, 8 Drawing Sheets

(51) Int. Cl.
   *H04B 7/06* (2006.01)
   *H01Q 3/26* (2006.01)
   *H04B 7/0417* (2017.01)
   *H04B 17/12* (2015.01)

(52) U.S. Cl.
   CPC ......... *H04B 7/0469* (2013.01); *H04B 7/0617* (2013.01); *H04B 7/063* (2013.01); *H04B 17/12* (2015.01)

(56) References Cited

U.S. PATENT DOCUMENTS

2016/0173180 A1   6/2016   Cheng et al.
2016/0337056 A1*  11/2016  Frenne ................. H04B 7/0695

FOREIGN PATENT DOCUMENTS

WO   WO 2011/093805 A1   8/2011
WO   WO 2016054809       4/2016

OTHER PUBLICATIONS

Taylan Aksoy: "Mutual Coupling Calibration of Antenna Arrays for Direction-of-Arrival Estimation", Feb. 1, 2012, XP055390623.

Ferreol et al.: "On the introduction of an extended coupling matrix for a 2D bearing estimation with an experimental RF system"; Signal Processing, Elsevier Science Publishers.

3GPP TS 36.211 V10.7.0, 3rd Generation Partnership Project; Technical Specification Group Radio Access Network; Evolved Universal Terrestrial Radio Access (E-UTRA); Physical.

3GPP TR 36.897 V13.0.0: 3rd Generation Partnership Project; Technical Specification Group Radio Access Network; Study on elevation beamforming / Full-Dimension (FD) Multiple.

Hyoungju Ji et al.: "Overview of Full-Dimension MIMO in LTE-Advanced Pro," https://arxiv.org/abs/1601.00019, Aug. 2016.

Gerd Sommerkorn et al.: "Uniform Rectangular Antenna Array Design and Calibration Issues for 2-D ESPRIT Application," European Personal and Mobile Communications Conference, F.

Florian Roemer et al.: "Polarimetric Compressive Sensing Based DOA Estimation," Workshop on Smart Antennas, Mar. 2014.

M. Landmann et al.: "Common Pitfalls in Multidimensional High Resolution Channel Parameter Estimation", IEEE Digital Signal Processing Workshop, Sep 2009.

Erik Dahlman et al.: "4G: LTE/LTE-Advanced for Mobile Broadband," Academic Press, 2011. (ISBN:012385489X 9780123854896).

* cited by examiner

| Description | $F_2$ |
|---|---|
| Single beam selection for a single wave polarization (select the 3$^{rd}$ beam from a set of D beams from $F_1$ for the horizontal polarization) | $F_2 = \begin{bmatrix} \tilde{e}^{(5)} \\ \tilde{e}^{(5)} \\ \vdots \\ \tilde{e}^{(5)} \end{bmatrix} \in C^{2 \cdot D \cdot P \times 1}$ |
| Single beam selection for both wave polarizations (select the 3$^{rd}$ beam from a set of D beams from $F_1$ for both the horizontal and vertical polarizations) | $F_2 = \begin{bmatrix} \tilde{e}^{(5)} & \tilde{e}^{(6)} \\ \tilde{e}^{(5)} & \tilde{e}^{(6)} \\ \vdots & \vdots \\ \tilde{e}^{(5)} & \tilde{e}^{(6)} \end{bmatrix} \in C^{2 \cdot D \cdot P \times 2}$ |
| Single beam selection for both wave polarizations with co-phasing between them (select the 3$^{rd}$ beam; $\delta_p$, $p=1,2,\ldots,P$ are the phase adjustments for various antenna orientations between the two wave polarizations) | $F_2 = \begin{bmatrix} \tilde{e}^{(5)} & e^{j\delta_1}\tilde{e}^{(6)} \\ \tilde{e}^{(5)} & e^{j\delta_2}\tilde{e}^{(6)} \\ \vdots & \vdots \\ \tilde{e}^{(5)} & e^{j\delta_P}\tilde{e}^{(6)} \end{bmatrix} \in C^{2 \cdot D \cdot P \times 2}$ |
| Multiple beam selection for a single wave polarization (select the 3$^{rd}$ and 5$^{th}$ beam for the horizontal polarization) | $F_2 = \begin{bmatrix} \tilde{e}^{(5)} & \tilde{e}^{(9)} \\ \tilde{e}^{(5)} & \tilde{e}^{(9)} \\ \vdots & \vdots \\ \tilde{e}^{(5)} & \tilde{e}^{(9)} \end{bmatrix} \in C^{2 \cdot D \cdot P \times 2}$ |
| Multiple beam selection for both wave polarizations with co-phasing between them (select the 3$^{rd}$ and 5$^{th}$ beam; $\delta_p$, $p=1,2,\ldots,P$ and $\eta_p$, $p=1,2,\ldots,P$ are the phase adjustments for various antenna orientations between the two wave polarizations for the two beams) | $F_2 = \begin{bmatrix} \tilde{e}^{(5)} & e^{j\delta_1}\tilde{e}^{(6)} & \tilde{e}^{(9)} & e^{j\eta_1}\tilde{e}^{(10)} \\ \tilde{e}^{(5)} & e^{j\delta_2}\tilde{e}^{(6)} & \tilde{e}^{(9)} & e^{j\eta_2}\tilde{e}^{(10)} \\ \vdots & \vdots & \vdots & \vdots \\ \tilde{e}^{(5)} & e^{j\delta_P}\tilde{e}^{(6)} & \tilde{e}^{(9)} & e^{j\eta_P}\tilde{e}^{(10)} \end{bmatrix} \in C^{2 \cdot D \cdot P \times 4}$ |

Fig. 7

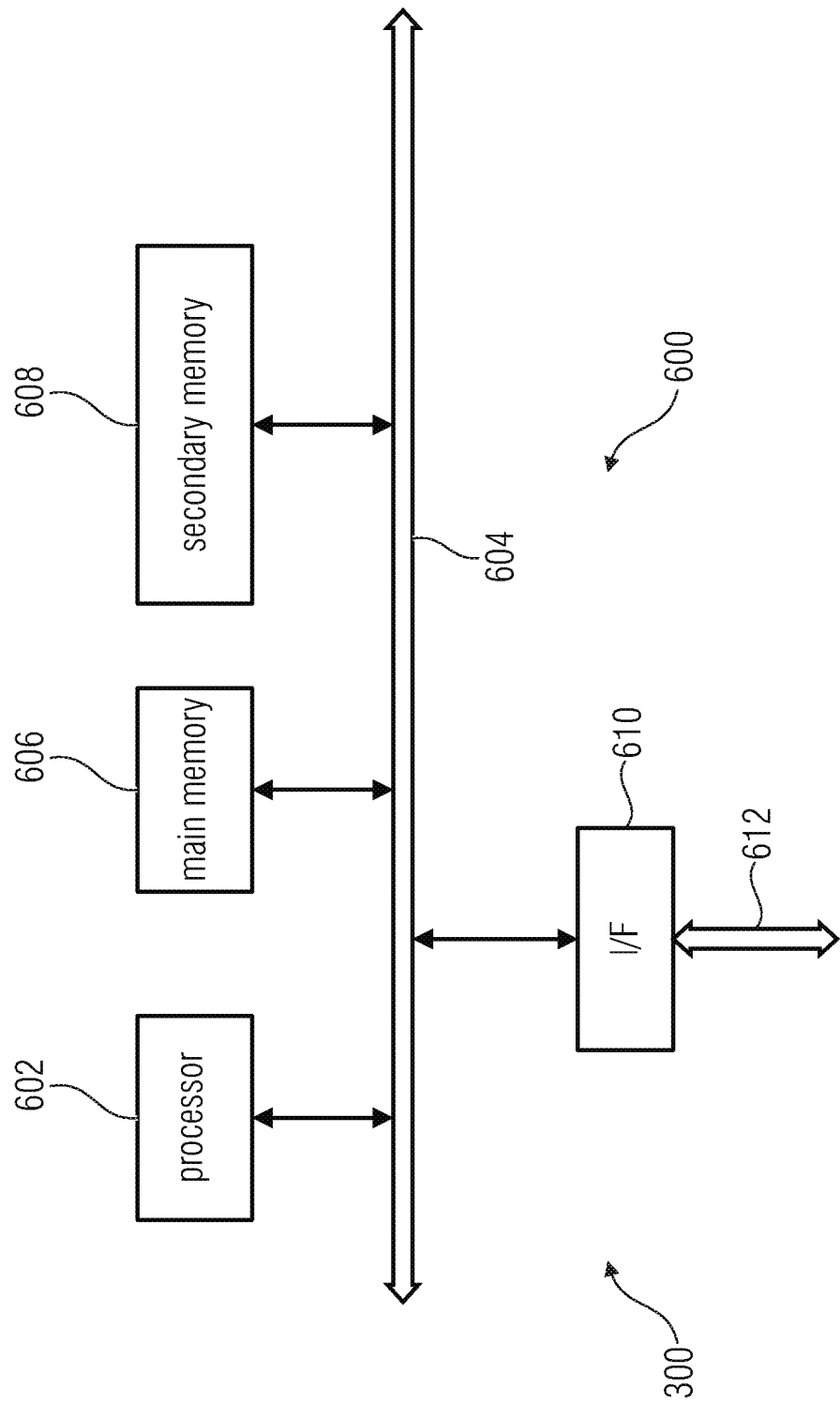

BEAMFORMING CODEBOOK ADAPTION TO ANTENNA ARRAY IMPERFECTIONS

CROSS-REFERENCES TO RELATED APPLICATIONS

This application is a continuation of co-pending International Application No. PCT/EP2018/052561, filed Feb. 1, 2018, which is incorporated herein by reference in its entirety, and additionally claims priority from European Application No. EP 17 154 486.9, filed Feb. 2, 2017, which is incorporated herein by reference in its entirety.

The present invention concerns the field of wireless communication systems, such as a mobile communication network. Embodiments of the present invention relate to a multi-antenna technique using a precoder and a codebook with beamforming coefficients adapt to practical imperfections of the antenna array. Further embodiments relate to a codebook downloadable from a base station for elevation and azimuth beamforming.

BACKGROUND OF THE INVENTION

FIG. 1 is a schematic representation of an example of the wireless network 100 or wireless network infrastructure of the wireless communication system of FIG. 1. The wireless network 100 may include a plurality of base stations eNB$_1$ to eNB$_5$, each serving a specific area surrounding the base station schematically represented by the respective cells 102$_1$ to 102$_5$. The base stations are provided to serve users within a cell. A user may be a stationary device or a mobile device. Further, the wireless communication system may be accessed by IoT devices which connect to a base station or to a user. IoT devices may include physical devices, vehicles, buildings and other items having embedded therein electronics, software, sensors, actuators, or the like as well as network connectivity that enable these devices to collect and exchange data across an existing network infrastructure. FIG. 2 shows an exemplary view of only five cells, however, the wireless communication system may include more such cells. FIG. 1 shows two users UE1 and UE2, also referred to as user equipment (UE), that are in cell 102$_2$ and that are served by base station eNB$_2$. Another user UE$_3$ is shown in cell 102$_4$ which is served by base station eNB$_4$. The arrows 104$_1$, 104$_2$ and 104$_3$ schematically represent uplink/downlink connections for transmitting data from a user UE$_1$, UE$_2$ and UE$_3$ to the base stations eNB$_2$, eNB$_4$ or for transmitting data from the base stations eNB$_2$, eNB$_4$ to the users UE$_1$, UE$_2$, UE$_3$. Further, FIG. 1 shows two IoT devices 106$_1$ and 106$_2$ in cell 102$_4$, which may be stationary or mobile devices. The IoT device 106$_1$ accesses the wireless communication system via the base station eNB$_4$ to receive and transmit data as schematically represented by arrow 108$_1$. The IoT device 106$_2$ accesses the wireless communication system via the user UE$_3$ as is schematically represented by arrow 108$_2$.

The wireless communication system may be any single-tone or multicarrier system based on frequency-division multiplexing, like the orthogonal frequency-division multiplexing (OFDM) system, the orthogonal frequency-division multiple access (OFDMA) system defined by the LTE standard, or any other IFFT-based signal with or without CP, e.g. DFT-s-OFDM. Other waveforms, like non-orthogonal waveforms for multiple access, e.g. filter-bank multicarrier (FBMC), generalized frequency division multiplexing (GFDM) or universal filtered multi carrier (UFMC), may be used.

For data transmission, a physical resource grid may be used. The physical resource grid may comprise a set of resource elements to which various physical channels and physical signals are mapped. For example, the physical channels may include the physical downlink and uplink shared channels (PDSCH, PUSCH) carrying user specific data, also referred to as downlink and uplink payload data, the physical broadcast channel (PBCH) carrying for example a master information block (MIB) and a system information block (SIB), the physical downlink control channel (PDCCH) carrying for example the downlink control information (DCI), etc. For the uplink, the physical channels may further include the physical random access channel (PRACH or RACH) used by UEs for accessing the network once a UE synchronized and obtained the MIB and SIB. The physical signals may comprise reference signals (RS), synchronization signals and the like. The resource grid may comprise a frame having a certain duration, e.g. a frame length of 10 milliseconds, in the time domain and having a given bandwidth in the frequency domain. The frame may have a certain number subframes of predefined length, e.g., 2 subframes with a length of 1 millisecond. Each subframe may include two slots of 6 or 7 OFDM symbols depending on the cyclic prefix (CP) length. The PDCCH may be defined by a pre-defined number of OFDM symbols per slot. For example, the resource elements of the first three symbols may be mapped to the PDCCH.

In a wireless communication system like to one depicted schematically in FIG. 1, multi-antenna techniques may be used, e.g., in accordance with LTE, to improve user data rates, link reliability, cell coverage and network capacity. To support multi-stream or multi-layer transmissions, linear precoding is used in the physical layer of the communication system. Linear precoding is performed by a precoder matrix which maps layers of data to antenna ports. The precoding may be seen as a generalization of beamforming, which is a technique to spatially direct/focus data transmission towards an intended receiver.

In the following the downlink (DL) transmission in a mobile multiple input multiple output communication system will be considered, i.e., the communication link carrying data traffic from a base station (eNodeB) to a mobile user equipment (UE). Considering a base station (eNodeB) with $N_{Tx}$ antennas and a mobile user equipment (UE), with $N_{Rx}$ antennas, the symbols received at a particular instant of time in a DL transmission at the UE $y \in \mathbb{C}^{N_{Rx} \times 1}$, can be written as $$y = HFs + n \qquad (1)$$

where $H \in \mathbb{C}^{N_{Rx} \times N_{Tx}}$ denotes the channel matrix, $F \in \mathbb{C}^{N_{Tx} \times N_s}$ represents the precoder matrix at the eNodeB, $n \in \mathbb{C}^{N_{Rx} \times 1}$ is the additive noise at the receiver, $s \in \mathbb{C}^{N_s \times 1}$ is the data vector transmitted by the eNodeB which has to be decoded by the UE, and $N_s$ denotes the number of data streams transmitted.

The precoder matrix that has to be used at the eNodeB to map the data $s \in \mathbb{C}^{N_s \times 1}$ to the $N_{Tx}$ antenna ports is decided by solving an optimization problem that is based on the instantaneous channel information $H \in \mathbb{C}^{N_{Rx} \times N_{Tx}}$. In a closed-loop mode of communication, the UE estimates the state of the channel and transmits the reports, channel state information (CSI), to the eNodeB via a feedback channel in the uplink (the communication link carrying traffic from the UE to the eNodeB) so that the eNodeB may determine the precoding matrix (see reference [8]). There are also occasions when multiple-layer transmissions are performed without feedback from the UE to determine the precoding matrices. Such a mode of communication is called 'open-loop' and the eNodeB makes use of signal diversity and spatial multiplexing to transmit information (see reference [8]).

In the following, the closed-loop DL transmission mode will be considered. The CSI feedback sent to the eNodeB in the closed-loop mode may be of two different types: implicit and explicit. FIG. 2 shows a block-based model of the MIMO DL transmission using codebook-based-precoding in accordance with LTE release 8. FIG. 2 shows schematically the base station 200, the user equipment 300 and the channel 400, like a radio channel for a wireless data communication between the base station 200 and the user equipment 300. The base station includes an antenna array 202 having a plurality of antennas or antenna elements, and a precoder 204 receiving a data vector 206 and a precoder matrix F from a codebook 208. The channel 400 may be described by the channel matrix 402. The user equipment 300 receives the data vector 302 via an antenna or an antenna array 304 having a plurality of antennas or antenna elements. Further, a feedback channel 500 between the user equipment 300 and the base station 200 is shown for transmitting feedback information.

In the case of an implicit feedback, the CSI transmitted by the UE 300 over the feedback channel 500 includes the rank index (RI), the precoding matrix index (PMI) and the channel quality index (CQI) allowing, at the eNodeB 200, deciding the precoding matrix, and the modulation order and coding scheme (MCS) of the symbols transmitted. The PMI and the RI are used to determine the precoding matrix from a predefined set of matrices $\Omega$ called 'codebook' 208. The codebook 208, e.g., in accordance with LTE, may be a look-up table with matrices in each entry of the table, and the PMI and RI from the UE decide which row and column of the table the optimal precoder matrix is obtained from.

The codebook designs in DL transmissions may be specific to the number of antenna ports used for the transmission. For example, when two ports are used for the transmission, the codebook entries come from the columns of 2×2 unitary matrices with constant modulus entries (see reference [1]). For a 4-port transmission, the columns of householder matrices $B_n = I_4 - 2u_n u_n^H / u_n^H u_n$ may be used for the precoder $F \in \mathbb{C}^{N_{Tx} \times N_s}$ ($N_s \leq 4$ in this case), where $u_n \in \mathbb{C}^{N_{Tx} \times 1}$ is a vector with unit modulus entries, with n denoting the codebook index (see reference [1]).

With explicit CSI feedback, there is no use of a codebook to determine the precoder. The coefficients of the precoder matrix are transmitted explicitly by the UE. Alternatively, the coefficients of the instantaneous channel matrix may be transmitted, from which the precoder is determined by the eNodeB.

The design and optimization of the precoder 204 and the codebook 28 may be performed for eNodeBs equipped with 1-dimensional Uniform Linear Arrays (ULAs) or 2-dimensional Uniform Planar Arrays (UPAs) having a fixed down-tilt. These antenna arrays 202 allow controlling the radio wave in the horizontal (azimuth) direction so that azimuth-only beamforming at the eNodeB 200 is possible. In accordance with other examples, the design of the codebook 208 is extended to support UPAs for transmit beamforming on both vertical (elevation) and horizontal (azimuth) directions, which is also referred to as full-dimension (FD) MIMO (see reference [2]).

The codebook 208 in FD-MIMO is designed based on the array response of an ideal UPA. The response of an antenna array, also referred to as 'array response vectors', with $N_{Tx}$ antenna ports is a complex-valued vector of size $N_{TX} \times 1$ which contains the amplitude gain and the (relative) phase shift induced or obtained at each antenna port of the antenna array 202 for a wavefront incident from a certain direction. The response of an array is usually represented as a function of angle of arrival or angle or departure. The codebook 208 used in the case of massive antenna arrays such as the ones FD-MIMO, is a set of beamforming weights that forms spatially separated electromagnetic transmit/receive beams using the array response vectors of the array. The beamforming weights of the array are amplitude gains and phase adjustments that are applied to the signal fed to the antennas (or the signal received from the antennas) to transmit (or obtain) a radiation towards (or from) a particular direction. The components of the precoder matrix are obtained from the codebook of the array, and the PMI and the RI are used to 'read' the codebook and obtain the precoder.

The array steering vectors of an ideal UPA having identical antennas with ideal antenna placement, e.g., antennas placed with infinite precision as dictated by the geometry, and omnidirectional radiation patterns may be described by the columns of a 2-D Discrete Fourier Transform (DFT) matrix (see reference [4]). Hence, for the codebook of 2D UPAs 2D-DFT-based matrices may be used. 2D-DFT-based matrices are defined for a scalable number of antenna ports, e.g., up to 32 antenna ports per polarization/antenna orientation, or 64 antenna ports in co-polarized antenna arrays (see reference [2]).

The precoder matrices used in FD-MIMO may have a dual-stage structure: $F = F_1 F_2$. Here, the matrix $F_1$ contains the beamforming vectors which are defined by a 2D-DFT codebook, i.e., the matrix $F_1$ contains the beamforming weights applied to each antenna port of the array to direct the radiation towards a particular direction. The matrix $F_2$ contains coefficients that select and/or linearly combine the 2D-DFT beams in the matrix $F_1$ to obtain a desired overall beam pattern. The matrix $F_2$ may also be used to perform co-phasing between different antenna orientations/polarization groups of the array (see reference [2]).

In massive antenna arrays, multiple antennas that are oriented in different directions may be placed at a particular position in the array, i.e., there are P antenna ports at each position).

Each of the antennas is sensitive to a particular polarization of the transmitted or received wavefront. As the orientation of the antenna defines the polarization direction of the wavefront it is sensitive to, the terms 'antenna orientations' and 'antenna polarizations' may be used interchangeably. However, in the following 'antenna orientation(s)' is used wherever applicable instead of 'antenna polarization(s)' so as to avoid confusion with wave polarizations that are also described introduced later. Considering a generic geometry of the array, the components of the FD-MIMO-type two-stage precoder matrix for an array with $N_{Tx}$ antenna ports per orientation, and P different antenna orientations among the antennas are, as shown, in the following equation:

$$F = F_1 F_2 = \begin{bmatrix} s_1^1 & s_2^1 & \ldots & s_D^1 & & 0 & \\ & \vdots & & \ddots & & \vdots & \\ 0 & & \ldots & s_1^P & s_2^P & \ldots & s_D^P \end{bmatrix} [c^1 \ldots c^{D'}]. \quad (2)$$

The matrix $F_1 \in \mathbb{C}^{N_{Tx} \cdot P \times D \cdot P}$ has a block-diagonal structure. Each of the vectors $s_d^p \in \mathbb{C}^{N_{Tx} \times 1}$, d=1, 2, ..., D and p=1, 2, ..., P in $F_1$ corresponds to a beamforming vector that steers the beam along certain d-th direction selected from D directions, using the antennas oriented in the p-th direction. The possible vectors for $s_d^p \in \mathbb{C}^{N_{Tx} \times 1}$ are the columns contained in the so-called 'codebook' matrix of the array, which contains the steering vectors for various angles of radiation.

The vectors $c^d$, d=1, 2, . . . , D' in $F_2 \in \mathbb{C}^{D \cdot P \times D'}$ are used to perform the beam selection or perform a linear combination of beams. The combination/co-phasing of the beams may be performed within and across different antenna polarizations in this matrix. The variable D' denotes the number of beams formed effectively.

To illustrate the use of the combining matrix $F_2$, the types of vectors used in the matrix are provided along with the purpose they satisfy.

To select a specific beam out of the D steered beam directions in the matrix $F_1$ from both orientations/polarizations, the vector $e^{(d)} \in \mathbb{C}^{D \times 1}$, d=1, 2, . . . , D may be used which contains $\mathbb{C}$ zeros at all positions except the d-th position, which is one. For instance, $$F_2 = \begin{bmatrix} e^{(3)} \\ e^{(3)} \\ \vdots \\ e^{(3)} \end{bmatrix} \in \mathbb{C}^{D \cdot P \times 1} \quad (3)$$

selects the beam steering direction corresponding to the third column vector (in each of the block matrices along the diagonal) in the matrix $F_1$. Multiple beams can be selected using multiple columns, for e.g., $$F_2 = \begin{bmatrix} e^{(3)} & e^{(5)} \\ e^{(3)} & e^{(5)} \\ \vdots & \vdots \\ e^{(3)} & e^{(5)} \end{bmatrix} \in \mathbb{C}^{D \cdot P \times 2} \quad (4)$$

selects the beam directions corresponding to the third and fifth columns in $F_1$. To perform beam selection while co-phasing between polarizations, a matrix of type $$F_2 = \begin{bmatrix} e^{j\delta_1} e^{(i)} \\ e^{j\delta_2} e^{(i)} \\ \vdots \\ e^{j\delta_P} e^{(i)} \end{bmatrix} \in \mathbb{C}^{D \cdot P \times 1} \quad (5)$$

may be used, where the values $\delta_p$, p=1, 2, . . . , P are the phase adjustments. Using vectors with more than one non-zero element, while using complex coefficients with varying amplitudes, means that multiple steering vectors are combined while forming the beam.

The structure of the precoder in (2) considers that the number of columns in each of the blocks, i.e., the number of beamforming vectors for each of the antenna orientations, is the same for each block. Such a structure is assumed for the sake of simplicity of notation and providing examples for $F_2$, and may be readily generalized with a different number of beamforming vectors for different antenna orientations.

The precoder structure in (2) and the structure of the individual matrices $F_1$ and $F_2$ are generalizations of the precoder structure in FD-MIMO for an arbitrary array geometry. For example, Release-13 FD-MIMO has been standardized for a uniform planar array as shown in FIG. 3. The configuration of a UPA may be represented as ($N_{Tx}^H$, $N_{Tx}^V$, P) where $N_{Tx}^H$ denotes the number of antenna ports a row of the UPA (in horizontal direction, hence the superscript 'H') per antenna orientation, $N_{Tx}^V$ denotes the number of antenna ports across a column per antenna orientation, and P represents the number of antenna orientations in the array. Therefore, a total of $N_{Tx}^H N_{Tx}^V P$ antenna ports are present in the array. The values of P=1 and P=2 are used for co-polarized and dual-polarized arrays, respectively. FIG. 3 shows a typical UPA used in FD-MIMO with P=2, along with the precoder structure.

The matrix $F_1 \in \mathbb{C}^{N_{Tx}^H \cdot N_{Tx}^V \cdot 2 \times D \cdot P}$ has a block-diagonal structure to separate the beams for the two polarization groups. Moreover, a Kronecker product model is applied to the steering or beamforming vectors in $F_1$ to decouple them into separate horizontal and vertical steering vectors of the UPA. The steering vectors for each direction are taken from the codebooks for the respective directions. The codebook for the horizontal direction, in the UPA (the rows), denoted by $\Omega_H$, is given by a DFT matrix of size $N_{Tx}^H \times M$, where M is the number of samples in the angular domain along the horizontal direction. Similarly, $\Omega_V$ is the codebook for the vertical direction (columns of the UPA) and given by a DFT matrix of size $N_{Tx}^V \times N$ with N being the number of samples in the angular domain in the vertical direction. The matrices $X_H^l$, $X_V^k$, $X_H^{l'}$ and $X_V^{k'}$ shown in FIG. 3 are formed by selecting a set of columns from the DFT matrices $\Omega_H$ or $\Omega_V$. Each of the matrices has the following structure:

$$X_H^l = [x_H^{(1)} \ x_H^{(2)} \ \ldots \ x_H^{(l)}] \text{ with } x_H^{(i)} \in \Omega_H, i = 1, 2, \ldots, l \quad (6)$$

$$X_H^{l'} = [x_H^{(1)} \ x_H^{(2)} \ \ldots \ x_H^{(l')}] \text{ with } x_H^{(i)} \in \Omega_H, i = 1, 2, \ldots, l'$$

$$X_V^k = [x_V^{(1)} \ x_V^{(2)} \ \ldots \ x_V^{(k)}] \text{ with } x_V^{(i)} \in \Omega_V, i = 1, 2, \ldots, k$$

$$X_V^{k'} = [x_V^{(1)} \ x_V^{(2)} \ \ldots \ x_V^{(k')}] \text{ with } x_V^{(i)} \in \Omega_V, i = 1, 2, \ldots, k'$$

The superscripts of the matrices differ depending upon the number of columns in the matrix and the set of columns selected from the DFT matrices; l=l' and k=k' means that the blocks for both polarizations in $F_1$ are identical (see reference [2]).

The second matrix $F_2$ contains coefficients that select and/or linearly combine the array steering vectors in $F_1$ to obtain the desired beam pattern. The choices for various functionalities such as single/multiple beam selection and co-phasing between selected beams are as shown in equations (3) to (5).

The 2D-DFT-based codebook design used in FD-MIMO is advantageous as the overall codebook may be divided into horizontal and vertical codebooks allowing for separate azimuth and elevation precoding, and as separate feedback information is delivered to the eNodeB for the azimuth and elevation domains. Further, the 2D-DFT-based codebook for FD-MIMO allows describing the array steering vectors of an ideal UPA by the columns of the 2D-DFT matrix (see reference [4]). However in practice, due to the non-identical and directional behavior of antennas in the antenna array, and due the electromagnetic coupling between the antennas, the actual observed array response is typically different from a DFT-based manifold considered for the codebook designs in FD-MIMO. Hence, using the 2D-DFT-based codebook for non-ideal arrays does not result in the appropriate/expected directional beam pattern.

BIALKOWSKI M E ET AL: "Effect of Mutual Coupling on the Interference Rejection Capabilities of Linear and Circular Arrays in CDMA Systems", IEEE TRANSAC- TIONS ON ANTENNAS AND PROPAGATION, IEEE SERVICE CENTER, PISCATAWAY, N.J., US, vol. 52, no. 4, 1 Apr. 2004 (2004-Apr.-1), pages 1130-1134, describes assessing the interference rejection capabilities of linear and circular arrays of dipoles of a base station of a code-division multiple-access cellular communication system. The effect of mutual coupling of the dipoles is taken into account.

US 2013/077705 A1 describes a method to improve codebook performance for non-linear arrays. The method includes determining a unitary matrix for a plurality of transmission antennas arranged in a given array type, the unitary matrix being determined based on a codebook, where the given array type is configured to steer beams in at least one of elevation and azimuth. The method also includes applying the determined unitary matrix to a signal to be transmitted across the plurality of transmission antennas.

WO 2016/054809 A1 a pre-coded information acquisition device, comprising a determination module, for determining a conversion quantity according to a steering vector and a range of an angle of departure of an antenna pattern, a transmission module, for transmitting to a terminal the information of the conversion quantity determined by the determination module, the information of the conversion quantity being used by the terminal to determine a PMI according to the information of the conversion quantity, a codebook for acquiring channel information and a pilot frequency measurement result, a receiving module, for receiving the PMI reported by the terminal. A network node transmits to the terminal the conversion quantity containing antenna information, and the terminal feeds back the PMI according to the conversion quantity, such that the network node can fully and flexibly acquire the channel information to adapt to application scenarios of different antenna patterns and different angles of departure.

BAXTER J R ET AL: "An experimental study of antenna array calibration", IEEE TRANSACTIONS ON ANTENNAS AND PROPAGATION, IEEE SERVICE CENTER, PISCATAWAY, N.J., US, vol. 51, no. 3, 1 Mar. 2003 (2003-Mar.-1), pages 664-667, describe a coupling matrix concept for predicting the radiation patterns of elements of an antenna array.

EP 3 046 271 A1 describes a method for operating a base station. The method includes receiving an uplink signal from a user equipment, wherein the uplink signal includes a precoding matrix indicator associated with a first precoder index of a codebook determined by a first and a second precoder indices, and a channel quality indicator. The method includes generating first signal streams by applying an open-loop diversity operation to at least one data stream including quadrature amplitude modulation symbols and generating a larger number of transmit data streams to be transmitted via a plurality of antennas by applying a precoding matrix to the first signal streams.

Taylan Aksoy: "MUTUAL COUPLING CALIBRATION OF ANTENNA ARRAYS FOR DIRECTION-OF-ARRIVAL ESTIMATION", February 2012 (2012-Feb.-1), describes a theoretic approach for mutual coupling characterization of antenna arrays. In this approach, the idea is to model the mutual coupling effect through a simple linear transformation between the measured and the ideal array data.

US 2016/173180 A1 describes a two-dimensional discrete Fourier transform based codebook for elevation beamforming. The codebook supports single stream codewords and multistream codewords. The two-dimensional discrete Fourier transform based codebook is generated by stacking the columns of the matrix product of two discrete Fourier transform codebook matrices. The codebook size may be flexibly designed based on appropriate beam resolution in azimuth and elevation.

WO 2011/093805 A1 describes a system comprised of a laser range and position finder, antennas with dielectric reflective and non-reflective coatings, multi-channel receivers for signal collection and base band conversion, calibration unit and a calibration processing. The method is used to calibrate antenna positions, gain/phase and mutual coupling simultaneously.

FERREOL ET AL: "On the introduction of an extended coupling matrix for a 2D bearing estimation with an experimental RF system", SIGNAL PROCESSING, ELSEVIER SCIENCE PUBLISHERS B.V. AMSTERDAM, NL, vol. 87, no. 9, 9 May 2007 (2007-May-9), pages 2005-2016, relates to narrow-band DOA (direction of arrival) estimation methods and provides an alternative to a mutual-coupling model by deriving a more accurate analytic expression of the true response.

SUMMARY

According to an embodiment, a transmitter may have: an antenna array having a plurality of antennas for a wireless communication with one or more receivers; and a precoder connected to the antenna array, the precoder to apply a set of beamforming weights to the antenna array, the set of beamforming weights selected from a codebook to form by the antenna array one or more transmit/receive beams or nulls pointing in selected directions; wherein the codebook includes a plurality of sets of beamforming weights for a plurality of directions, wherein the beamforming weights in the codebook are based on a first antenna array response matrix, the first antenna array response matrix defined by a second antenna array response matrix and one or more transformation matrices, wherein the first antenna array response matrix contains, for a plurality of directions, first array response vectors of the antenna array, the second antenna array response matrix contains, for one or more of the plurality of directions, second array response vectors of the antenna array, the second array response vectors determined using a model of the antenna array, and the one or more transformation matrices describing one or more characteristics of the antenna array, wherein the one or more transformation matrices are based on the second antenna array response matrix and a measured antenna array response matrix containing, for some or all of the plurality of directions, measured array response vectors determined from a measurement of the antenna array, and wherein the codebook is obtained from a first codebook modified using the one or more transformation matrices, the first codebook defined using the second antenna array response matrix.

According to another embodiment, a receiver may have: an antenna for a wireless communication with a transmitter; and a signal processor to receive and process a radio signal received at the antenna via a radio channel; wherein the receiver is configured to store and/or calculate a codebook including a plurality of sets of beamforming weights for a plurality of directions, wherein the beamforming weights in the codebook are based on a first antenna array response matrix of an antenna array of the transmitter, the first antenna array response matrix containing first array response vectors for a plurality of directions, the first array response vectors determined using a model of the antenna array of the transmitter, and the transmitter selecting a set of beamforming weights from the codebook to form by the antenna array a transmit/receive beam pointing in a selected direction, wherein the receiver is configured to modify the codebook using one or more transformation matrices received from the transmitter, wherein the one or more transformation matrices describe one or more characteristics of the antenna array of the transmitter, and wherein the one or more transformation matrices are based on the second antenna array response matrix and a measured antenna array response matrix containing, for some or all of the plurality of directions, measured array response vectors determined from a measurement of the antenna array of the transmitter.

According to another embodiment, a wireless communication network may have an inventive transmitter, and one or more receivers having: an antenna for a wireless communication with a transmitter; and a signal processor to receive and process a radio signal received at the antenna via a radio channel; wherein the receiver is configured to store and/or calculate a codebook including a plurality of sets of beamforming weights for a plurality of directions, wherein the beamforming weights in the codebook are based on a first antenna array response matrix of an antenna array of the transmitter, the first antenna array response matrix containing first array response vectors for a plurality of directions, the first array response vectors determined using a model of the antenna array of the transmitter, and the transmitter selecting a set of beamforming weights from the codebook to form by the antenna array a transmit/receive beam pointing in a selected direction, wherein the receiver is configured to modify the codebook using one or more transformation matrices received from the transmitter, wherein the one or more transformation matrices describe one or more characteristics of the antenna array of the transmitter, and wherein the one or more transformation matrices are based on the second antenna array response matrix and a measured antenna array response matrix containing, for some or all of the plurality of directions, measured array response vectors determined from a measurement of the antenna array of the transmitter.

According to another embodiment, a method may have the steps of: modifying a codebook used by a precoder of a transmitter, the transmitter including an antenna array having a plurality of antennas for a wireless communication with one or more receivers, and the precoder connected to the antenna array, wherein the codebook includes a plurality of sets of beamforming weights for a plurality of directions, the beamforming weights in the codebook based on a first antenna array response matrix, the first antenna array response matrix contains, for a plurality of directions, first array response vectors determined using a model of the antenna array, and wherein the codebook is modified using one or more transformation matrices, the one or more transformation matrices describing one or more characteristics of the antenna array, and wherein the one or more transformation matrices are based on the second antenna array response matrix and a measured antenna array response matrix containing, for some or all of the plurality of directions, measured array response vectors determined from a measurement of the antenna array of the transmitter.

According to another embodiment, a method may have the steps of: receiving and processing, at a receiver having an antenna for a wireless communication with a transmitter, a radio signal received at the antenna via a radio channel, the radio signal including one or more transformation matrices; and modifying, using the one or more transformation matrices, a codebook stored or calculated at the receiver and including a plurality of sets of beamforming weights for a plurality of directions, the beamforming weights in the codebook being based on a first antenna array response matrix of an antenna array of the transmitter, the first antenna array response matrix containing first array response vectors for a plurality of directions, the first array response vectors determined using a model of the antenna array of the transmitter, and the transmitter selecting a set of beamforming weights from the codebook to form by an antenna array a transmit/receive beam pointing in a selected direction, wherein the one or more transformation matrices describe one or more characteristics of the antenna array of the transmitter, and wherein the one or more transformation matrices are based on the second antenna array response matrix and a measured antenna array response matrix containing, for some or all of the plurality of directions, measured array response vectors determined from a measurement of the antenna array of the transmitter.

A non-transitory digital storage medium may have a computer program stored thereon to perform the method having the steps of: modifying a codebook used by a precoder of a transmitter, the transmitter including an antenna array having a plurality of antennas for a wireless communication with one or more receivers, and the precoder connected to the antenna array, wherein the codebook includes a plurality of sets of beamforming weights for a plurality of directions, the beamforming weights in the codebook based on a first antenna array response matrix, the first antenna array response matrix contains, for a plurality of directions, first array response vectors determined using a model of the antenna array, and wherein the codebook is modified using one or more transformation matrices, the one or more transformation matrices describing one or more characteristics of the antenna array, and wherein the one or more transformation matrices are based on the second antenna array response matrix and a measured antenna array response matrix containing, for some or all of the plurality of directions, measured array response vectors determined from a measurement of the antenna array of the transmitter, when said computer program is run by a computer.

Another non-transitory digital storage medium may have a computer program stored thereon to perform the method having the steps of: receiving and processing, at a receiver having an antenna for a wireless communication with a transmitter, a radio signal received at the antenna via a radio channel, the radio signal including one or more transformation matrices; and modifying, using the one or more transformation matrices, a codebook stored or calculated at the receiver and including a plurality of sets of beamforming weights for a plurality of directions, the beamforming weights in the codebook being based on a first antenna array response matrix of an antenna array of the transmitter, the first antenna array response matrix containing first array response vectors for a plurality of directions, the first array response vectors determined using a model of the antenna array of the transmitter, and the transmitter selecting a set of beamforming weights from the codebook to form by an antenna array a transmit/receive beam pointing in a selected direction, wherein the one or more transformation matrices describe one or more characteristics of the antenna array of the transmitter, and wherein the one or more transformation matrices are based on the second antenna array response matrix and a measured antenna array response matrix containing, for some or all of the plurality of directions, measured array response vectors determined from a measurement of the antenna array of the transmitter, when said computer program is run by a computer.

BRIEF DESCRIPTION OF THE DRAWINGS

Embodiments of the present invention will be detailed subsequently referring to the appended drawings, in which:

FIG. 7 shows a table indicting a beam functionality to be implemented and the corresponding selection/combining/co-phasing matrix used; and FIG. 8 illustrates an example of a computer system on which units or modules as well as the steps of the methods described in accordance with the inventive approach may execute.

DETAILED DESCRIPTION OF THE INVENTION

Figure 1:
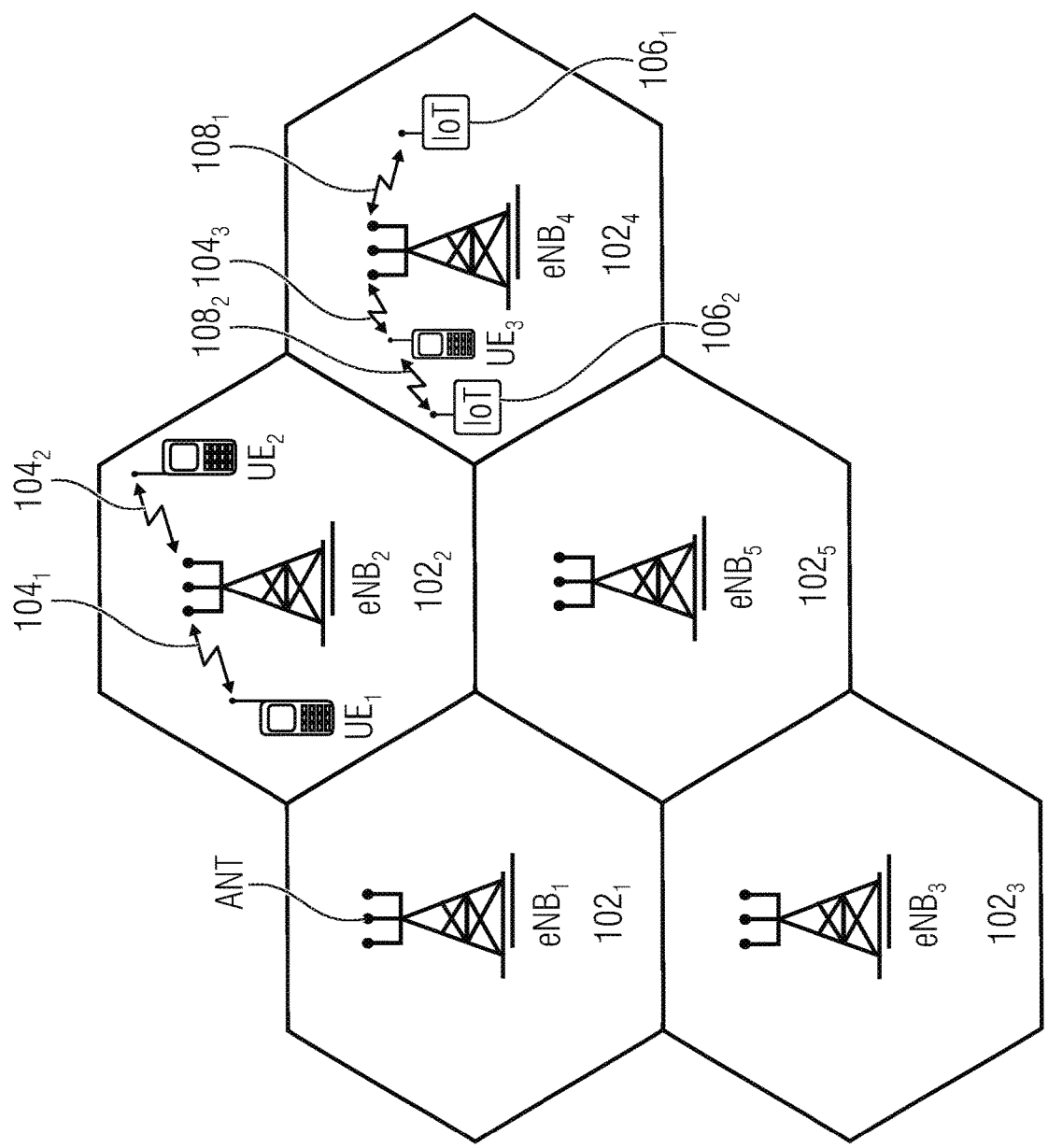
FIG. 1 shows a schematic representation of a system for implementing different services using the concept of network slices.

In the following, advantageous embodiments of the present invention are described in further detail with reference to the enclosed drawings in which elements having the same or similar function are referenced by the same reference signs.

In accordance with embodiments of the present invention in a wireless communication system the codebook including the beamforming weights is modified so as take into considerations an actual or real implementation of the antenna array at a transmitter, e.g. the base station for a DL communication. For example, when designing the codebook on the basis of a model of the antenna array, the model assumes identical, omnidirectional antennas with ideal antenna placement, no electromagnetic coupling between the antennas or any other practical imperfections in the array circuitry or the antennas. However, in reality the antenna array is not perfect, e.g., the antennas in the have a directional and non-identical nature, and there is an electromagnetic coupling between the antennas. To design the codebook taking into consideration the real antenna array properties, a response of the antenna array is measured for a plurality of particular incident angles of radiation, e.g., within an anechoic chamber or in the field of deployment. On the basis of this measurement, a deviation of the beamforming weights obtained from the antenna array model from the real implementation of the antenna array is determined and adapted so as to allow generating by the antenna array the actually desired or expected directional beam pattern.

In accordance with embodiments, a transmitter, e.g. a base station serving one or more UEs or a UE communicating with a base station, is provided including an antenna array having a plurality of antennas for a wireless communication with one or more receivers and a precoder connected to the antenna array, the precoder to apply a set of beamforming weights to the antenna array, the set of beamforming weights selected from a codebook to form by the antenna array one or more transmit/receive beams or nulls pointing in selected directions. The codebook includes a plurality of sets of beamforming weights for a plurality of directions. The beamforming weights in the codebook are based on a first antenna array response matrix, the first antenna array response matrix defined by a second antenna array response matrix and one or more transformation matrices. The first antenna array response matrix contains, for a plurality of directions, first array response vectors of the antenna array, the second antenna array response matrix contains, for one or more of the plurality of directions, second array response vectors of the antenna array, the second array response vectors determined using a model of the antenna array, and the one or more transformation matrices describing one or more characteristics of the antenna array.

In other words, according the present invention, the array response matrix of the transmitter's antenna array, which is based on the ideal antenna array that may be described by a model of the transmitter's antenna array, is adapted to the real world implementation of the transmitter's antenna array. This yields the non-ideal array response matrix reflecting the real or actual implementation of the transmitter's antenna array, which will form the basis for the precoder to be used by the transmitter. For adapting the model of the transmitter's antenna array the one or more transformation matrices are used, which describe one or more of the characteristics of the real antenna array of the transmitter.

Thus, the transformation matrix represents the deviation of the second antenna array response matrix, which is based on a model, from an actual structure of the antenna array, for which the respective matrix has been obtained by measuring the antenna array so that a new codebook may be obtained on the basis of a first codebook, which, in accordance with examples, may be a 2D-DFT based codebook which is modified using the transformation matrices. Therefore, in accordance with embodiments of the inventive approach, the transmitter is provided with a modified codebook, when compared to conventional approaches, so that when processing signals for transmission the precoder already operates on the basis of a codebook that is modified so as to take into consideration the actual configuration of the antenna array and its behavior so that, by simply using the modified codebook, the precoder operates on the signals to be transmitted without the need for any further intermediate computation or modification of, for example, response vectors obtained from a codebook and being applied to the input signals to be transmitted, as it is described in the known technology cited so far.

In the present invention, when referring to one or more of the plurality of directions, this means one of the plurality of directions, two or more of the plurality of directions, or all of the of the plurality of directions.

The one or more transformation matrices may be based on the second antenna array response matrix and a measured antenna array response matrix containing, for some or all of the plurality of directions, measured array response vectors determined from a measurement of the antenna array.

The model of the antenna array may be based on identical, omnidirectional antennas with ideal antenna placement, no electromagnetic coupling between the antennas or other practical imperfections in the array circuitry or the antennas, and the one or more transformation matrices may consider a directional and non-identical nature of the antennas in the antenna array, an electromagnetic coupling between the antennas and other practical imperfections in the antenna array.

In accordance with further embodiments, designing the codebook may include a modification of an initial or a first codebook which is obtained on the basis of the antenna array model, e.g., is defined by the second antenna array response matrix. The initial codebook is modified by linearly modelling/transforming the first antenna array response matrix using the second antenna array response matrix and the one or more transformation matrices. The modified codebook is as referred to as response-adapted-codebook. An advantage of using the transformation matrix for designing the modified codebook is that the information about the real antenna array may be provided to a receiver, e.g. a UE served by the base station, easily and without the need to transmit a huge amount of information to the UE. In accordance with embodiments, the information about the real implementation of the antenna array at the transmitter, like the base station, is transmitted to the receiver, like the UE, or may be downloaded by the receiver. The transmitted or downloaded information includes the transformation matrix. The availability of the actual transmitter antenna array response, or the used response-adapted-codebook, at the UE helps the UE in beam refining, channel estimation and CSI feedback calculation. The accuracy and amount of CSI feedback and accuracy of the channel estimation process heavily depend on the availability of the actual codebook (or the array response) used at the transmitter at the UE. Transmitting the measured array response to the UE as a whole would result in transmitting a huge amount of control information. In accordance with embodiments of the invention, the above mentioned transformation-matrix-based modeling of the measured response with the presumed ideal response of the array is used which involves that only the transformation matrix is transmitted, thereby reducing the control information overhead.

Thus, embodiments provide a receiver, e.g., a UE communicating with a base station or a base station serving one or more UEs, including an antenna for a wireless communication with a transmitter, and a signal processor to receive and process a radio signal received at the antenna via a radio channel. The receiver is configured to store and/or calculate a codebook including a plurality of sets of beamforming weights for a plurality of directions (e.g. azimuth, elevation, polarization). The beamforming weights in the codebook are based on a first antenna array response matrix of an antenna array of the transmitter, and the transmitter selects a set of beamforming weights from the codebook to form by the antenna array a transmit/receive beam pointing in a selected direction. The receiver is configured to modify the codebook using one or more transformation matrices received from the transmitter, the one or more transformation matrices modeling a second antenna array response matrix of the antenna array of the transmitter. The first antenna array response matrix contains first array response vectors for a plurality of directions, the first array response vectors determined using a model of the antenna array, and the second antenna array response matrix contains second array response vectors for a plurality of directions, the second array response vectors determined from a measurement of the antenna array.

In the following, the inventive approach will be described on the basis of embodiments of a DL communication in which the transmitter is the base station or eNodeB and the receiver is a UE served by the eNodeB. More specifically, adapting the eNodeB and the UE to a measured, complex-valued eNodeB array response in accordance with embodiments of the present invention are described in detail. In the following description of the embodiments, no assumptions with respect to the array geometry or the number of polarizations involved in the array are made, unless explicitly specified.

Array Response Transformation for Codebook Download

The response of an antenna array may be measured for a particular incident angle of radiation within an anechoic chamber or in the field of deployment. Due to directional and non-identical nature of the various antennas in the antenna array, electromagnetic coupling between antennas and other practical imperfections in the antenna array, the measured response of the antenna array is different from the presumed response of the antenna array, which considers identical, omnidirectional antennas without any practical imperfections. Therefore, the complex-valued measured response of the antenna array is also referred to in the following as the 'non-ideal' array response. Consider the 'non-ideal' complex-valued antenna array response at the eNodeB with $N_{Tx}$ antenna ports, $$\tilde{a}(\varphi_m,\theta_n)=[\tilde{a}_1(\varphi_m,\theta_n)\tilde{a}_2(\varphi_m,\theta_n) \ldots \tilde{a}_{N_{Tx}}(\varphi_m,\theta_n)]\in \mathbb{C}^{N_{Tx}\times 1} \quad (7)$$

for a set of discrete pairs of azimuth and elevation angles $(\varphi_m,\theta_n)$, m=1, 2, ... M and n=1, 2, ... N. Without any loss of generality, it can be assumed that the discrete samples of the angles were taken within the focus range of the antenna. Arranging all the array response vectors column-wise, we yield the array response matrix as $$\tilde{A}(\varphi,\theta)=[\tilde{a}(\varphi_1,\theta_1)\tilde{a}(\varphi_1,\theta_2) \ldots \tilde{a}(\varphi_m,\theta_n) \ldots \tilde{a}(\varphi_M,\theta_{N-1})\tilde{a}(\varphi_M,\theta_N)]\in \mathbb{C}^{N_{Tx}\times MN}. \quad (8)$$

Similar to the 'non-ideal' array response, the 'ideal' array response is defined as the presumed response of the array for the given geometry considering identical, omnidirectional antennas with ideal antenna placement, e.g., the antennas are placed at a certain point as dictated by the geometry with infinite precision, and no electromagnetic coupling between antennas or other practical imperfections in the array circuitry or antennas. The 'ideal' array response matrix looks like, $$A(\varphi,\theta)=[a(\varphi_1,\theta_1)a(\varphi_1,\theta_2) \ldots a(\varphi_m,\theta_n) \ldots a(\varphi_M,\theta_{N-1})a(\varphi_M,\theta_N)]\in \mathbb{C}^{N_{Tx}\times MN} \quad (9)$$

where the azimuth and elevation angles $(\varphi_m,\theta_n)$ in (9) are identical to the azimuth and elevation angles in (8).

Figure 3:
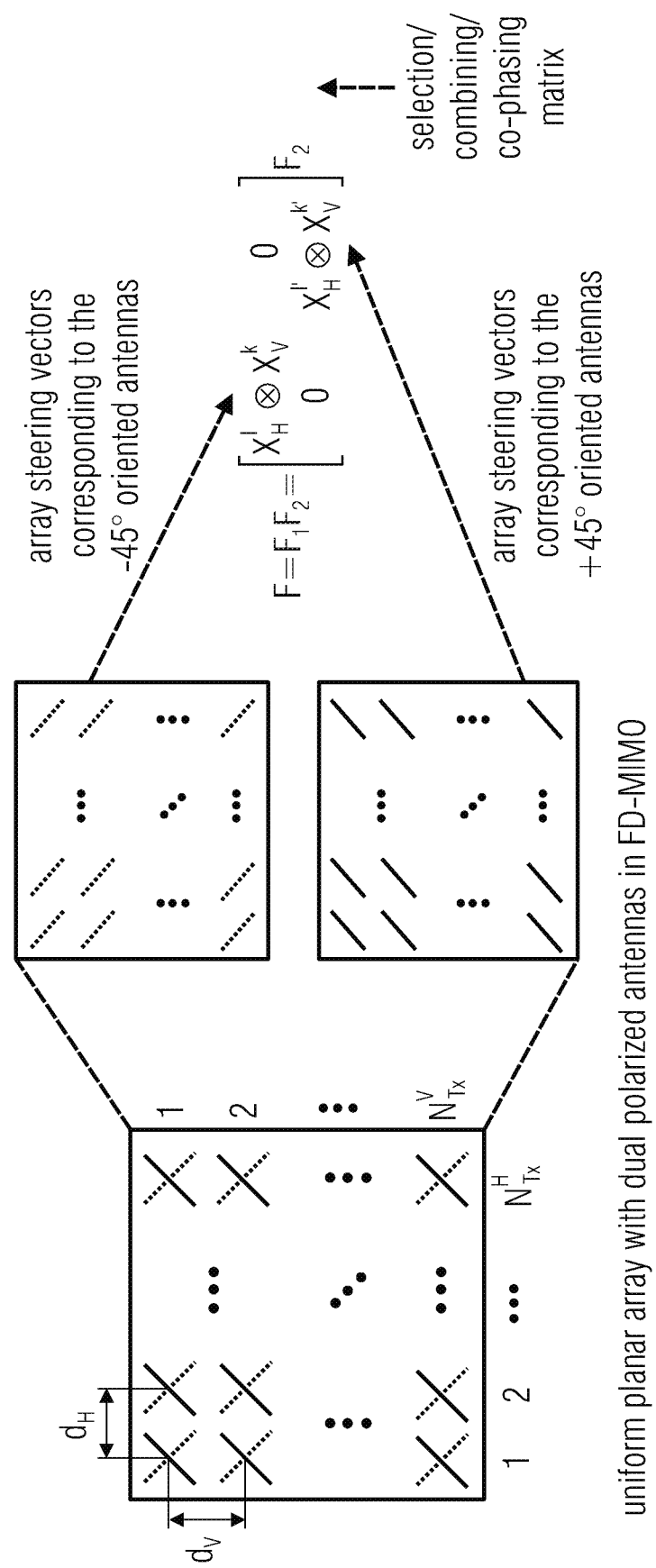
FIG. 3 shows an example of a ($N_{Tx}^H$, $N_{Tx}^V$, 2) uniform planar array in FD-MIMO and the corresponding precoding matrix structure.

The 'ideal' response of the array for a certain angle can be deduced from the geometry of the array. For example, the antenna array response of an ideal UPA as shown FIG. 3 (considering only one of the two orientations of the antennas and assuming that the wavefront has the same polarization as the antenna orientation responds to), is given by $$a(\varphi_m,\theta_n)=a^{(H)}(\varphi_m,\theta_n)\otimes a^{(V)}(\varphi_m,\theta_n)\in \mathbb{C}^{N_{Tx}^H \cdot N_{Tx}^V \times 1}, \quad (10)$$

where $$a^{(H)}(\varphi_m, \theta_n) = \begin{bmatrix} 1 & e^{-j2\pi\mu} & \ldots & e^{-j2\pi(N_{Tx}^H-1)\mu} \end{bmatrix}^T \in \mathbb{C}^{N_{Tx}^H \times 1}, \quad (11)$$

$$\mu = \frac{1}{\lambda}d_H \cdot \cos\varphi_m \cdot \sin\theta_n$$

$$a^{(V)}(\varphi_m, \theta_n) = \begin{bmatrix} 1 & e^{-j2\pi v} & \ldots & e^{-j2\pi(N_{Tx}^V-1)v} \end{bmatrix}^T \in \mathbb{C}^{N_{Tx}^V \times 1},$$

$$v = \frac{1}{\lambda}d_V \cdot \sin\varphi_m \cdot \sin\theta_n.$$

with λ being the wavelength of the wavefront.

It is assumed that the (measured) antenna array is calibrated, i.e., the response of the antenna array is known as a function of the azimuth and elevation angles—the matrix $\tilde{A}(\varphi,\theta)\in \mathbb{C}^{N_{Tx}\times MN}$ is a known quantity. As mentioned above, the 'non-ideal' array response is linearly modelled using the 'ideal' response of the array, which may be deduced from its geometry/configuration. The purpose of the linear modeling of the transmitter's antenna array is to have a compact representation of the 'non-ideal' response so that it may be downloaded by the UE instead of the raw coefficients of the response, which may result in an overload of control information to the UE.

There may be different ways to linearly model the 'non-ideal' array response matrix of the base station using the presumed 'ideal' response.

Separate Modeling of Pattern and Coupling:

In this linear transformation, denoted by $\mathcal{T}_1$, two matrices are used to perform the linear transformation from the 'ideal' response to the 'non-ideal' response of the array as follows (see reference [9]):

$$\tilde{A}(\varphi,\theta) = \mathcal{T}_1(A(\varphi,\theta)) = KA(\varphi,\theta)\Gamma + N. \quad (12)$$

The matrix $K \in \mathbb{C}^{N_{Tx} \times N_{Tx}}$ models electromagnetic coupling between the antennas in the array and $\Gamma \in \mathbb{C}^{MN \times MN}$ transforms the omnidirectional response of the 'ideal' antenna to the directional response of the 'non-ideal' antenna.

Combined Modeling of Pattern and Coupling:

This linear transformation, $\mathcal{T}_2$ involves a single matrix $K \in \mathbb{C}^{N_{Tx} \times N_{Tx}}$ that models both the pattern change from the 'ideal' array and the observed coupling effects in the 'non-ideal' array:

$$\tilde{A}(\varphi,\theta) = \mathcal{T}_2(A(\varphi,\theta)) = KA(\varphi,\theta) + N, \quad (13)$$

In both equation (12) and (13), the matrix $N \in \mathbb{C}^{N_{Tx} \times MN}$ represents the mismatch in the models, and the matrix $K \in \mathbb{C}^{N_{Tx} \times N_{Tx}}$ is referred to as the 'transformation matrix' which is used in constructing the response-adapted transmitter array codebook. Either of the linear models may be used to construct the transformation matrix that may be transmitted to the UE to obtain the 'non-ideal'-response-adapted codebook. Some examples of techniques that may be used to determine the transformation matrix $K \in \mathbb{C}^{N_{Tx} \times N_{Tx}}$ are:

(i) the least squares method, using the combined model of pattern and coupling $K = \tilde{A}(\varphi,\theta) \cdot A^H(\varphi,\theta) \cdot [A(\varphi,\theta) \cdot A^H(\varphi,\theta)]^{-1}$ (ii) the calibration matrix method described in reference [9] where the transformation matrix is evaluated from its inverse, the calibration matrix $C \in \mathbb{C}^{N_{Tx} \times N_{Tx}}$, using the first linear model of the 'non-ideal' response (separate modeling of pattern and coupling).

The accuracy of the techniques to determine the transformation matrix from a given linear model of the 'non-ideal' array response with minimal mismatch, i.e., arbitrarily low Frobenius norm of the residual matrix $N \in \mathbb{C}^{N_{Tx} \times MN}$, depends on the number of vectors transformed. For example, in the case of the least squares method that uses the linear model in equation (13), two cases of the residual matrix norm are encountered:

Rank$(A(\varphi,\theta))=MN \leq N_{Tx}$: Any row of the 'non-ideal' array response $\tilde{A}(\varphi,\theta)$ may be expressed as a linear combination of the rows of $A(\varphi,\theta)$. In this case there is no residual and the Frobenius norm of the residual/mismatch matrix N is zero.

Rank $(A(\varphi,\theta))=N_{Tx}<MN$: In this case, there are less rows than columns and hence the row space does not span the whole of $\mathbb{C}^{MN}$. Therefore, not every row of the 'non-ideal' array response $\tilde{A}(\varphi,\theta)$ can be expressed as a linear combination of the rows of the 'ideal' array response $A(\varphi,\theta)$. In such a case, the residual/mismatch matrix N is non-zero.

A similar dependency of the accuracy of the transformation (i.e., the norm of the residual) on the number of vectors transformed may be found across various techniques that may be used to compute the transformation matrix $K \in \mathbb{C}^{N_{Tx} \times N_{Tx}}$ using the linear models in equations (12) and (13). Therefore, altering the number of vectors involved in the transformation supports controlling the accuracy of the transformation. For a finely sampled angular space where the number of samples is much larger than the number of antennas, i.e., the number of array response vectors to be transformed are much more numerous than the number of antenna ports, in order to increase the accuracy of the transformation, the whole angular space ($\varphi,\theta$) may be partitioned into Q smaller (overlapping or non-overlapping) sub-sets $(\varphi_1,\theta_1), (\varphi_2,\theta_2), \ldots, (\varphi_Q,\theta_Q)$ where for each subset a linear transformation $\mathcal{T}(A(\varphi_q,\theta_q))$ can be defined $$\tilde{A}(\varphi_q,\theta_q) = \mathcal{T}(A(\varphi_q,\theta_q)), q=1,2,\ldots,Q. \quad (14)$$

Figure 4:
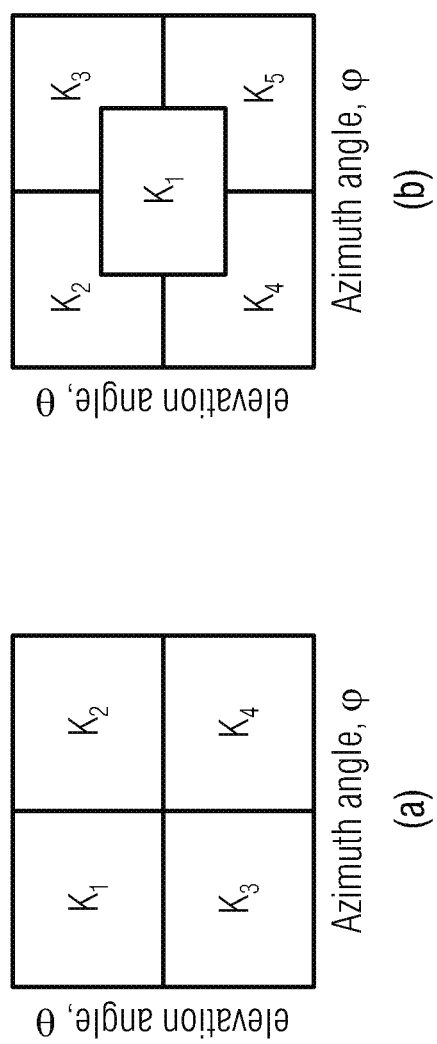
FIG. 4 shows different partitions of an angular space of an antenna for antenna response transformations in accordance with embodiments of the present invention.

By considering Q different transformations, we compute Q transformation matrices $K_q$, $q=1, 2, \ldots, Q$ one for each partition of the angular space. The transformation matrices $K_q$, $q=1, 2, \ldots, Q$ are dependent on the subset of angles transformed. Depending on the appropriate accuracy, the sizes of the angular space partitions may be varied. Two examples of non-overlapped and overlapped angular space partitions are shown in FIG. 4.

In accordance with further embodiments, the transformation matrix may be provided for an entire frequency space/domain of the antenna array. However, the array response may vary as a function of the frequency of the wavefront and hence there a different measured 'non-ideal' response matrices for different frequency bands may be provided. Similar to the angular space also the frequency space may be partitioned. The granularity of the frequency space partitions for the transformations may be determined by the frequency domain characteristics of the antennas and the array circuitry, and by the frequency domain sampling with which the antenna measurements/calibration was carried out. Therefore, in accordance with further embodiments, the frequency space may partitioned into a plurality of smaller overlapping or non-overlapping partitions, and for each partition the frequency space a transformation matrix may be obtained in a way as described above.

The transformation matrix(ces) may be determined by the eNodeB offline, for example the computations may be performed while there is no communication with the UE, and then the transformation matrix(ces) may be downloaded by the UE to construct the codebook of the eNodeB that is adapted to the 'non-ideal' array response. The transformation matrices sent to the UE are a part of the 'control information' as shown in FIG. 5.

Figure 2:
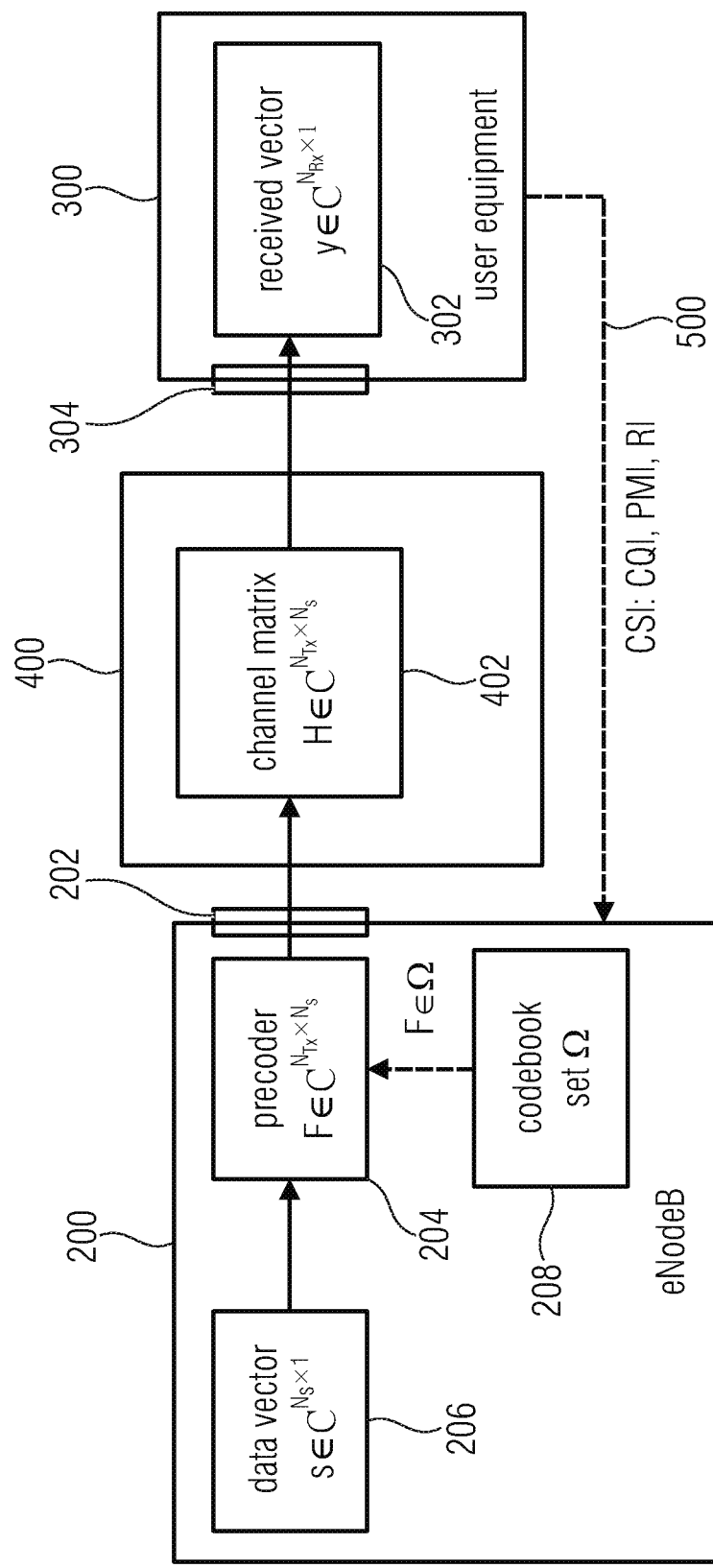
FIG. 2 shows a block-based model of a MIMO communication system using implicit CSI feedback.
Figure 5:
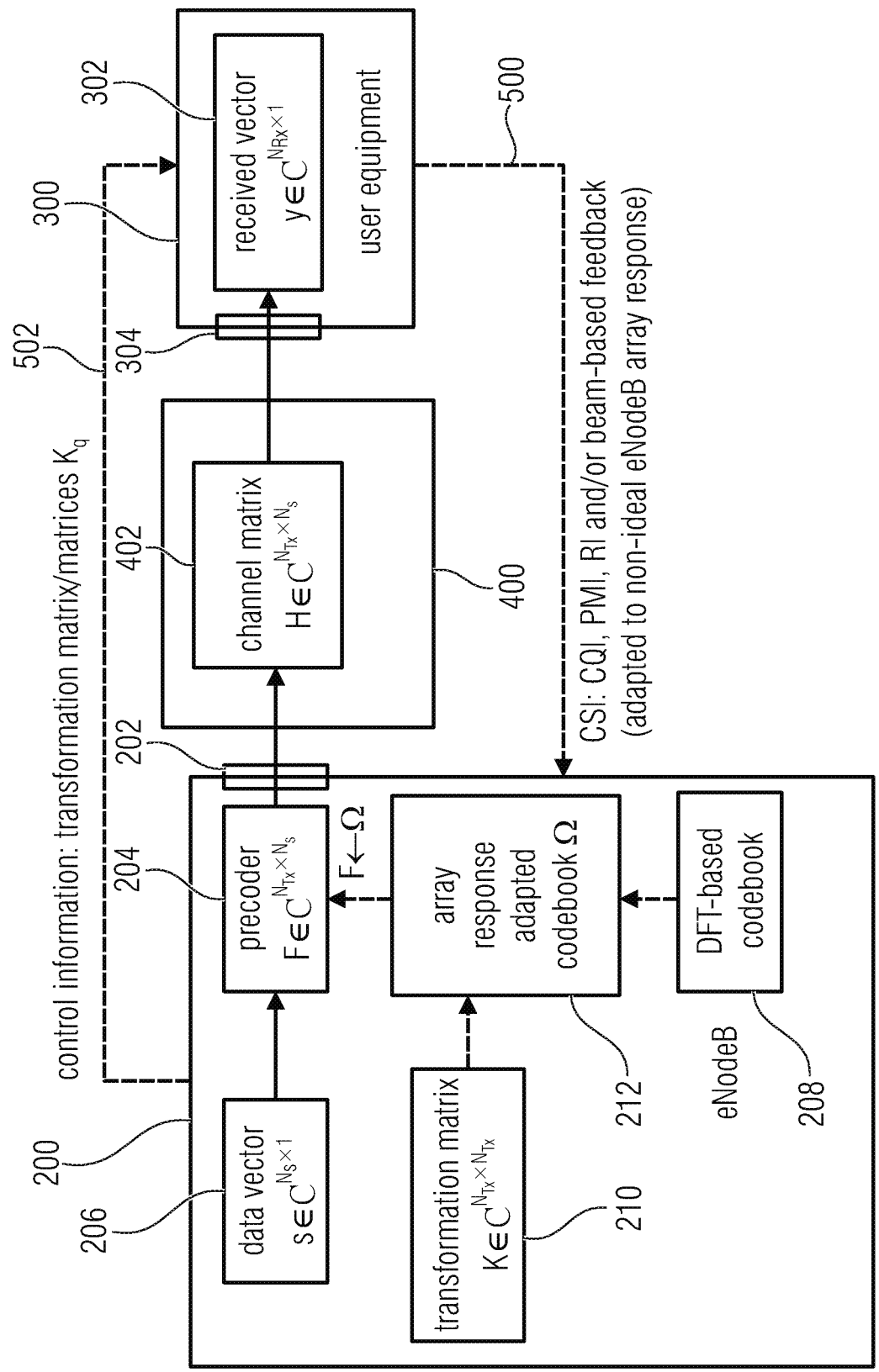
FIG. 5 shows a block-based structure of MIMO system operating on implicit CSI feedback with a codebook and CSI adapted to a measured eNodeB array response in accordance with embodiments of the present invention.

FIG. 5 shows a block-based structure of MIMO system operating on implicit CSI feedback with a codebook and CSI adapted to a measured eNodeB array response in accordance with embodiments of the present invention. Those elements of the MIMO system corresponding to those already described above with reference to FIG. 2 have assigned thereto the same reference signs. In accordance with embodiments of the present invention, the base station 200 includes the transformation matrix K. The transformation matrix K may be determined as described above and may be stored at the base station 200, e.g., in a storage device 210. On the basis of the transformation matrix K and the codebook 208, which may be a DFT codebook obtained in a way as described above, the array response adapted codebook 212 is obtained and used by the precoder to obtain an expected directional beam pattern despite any practical imperfections of the antenna array forming the beam pattern. In accordance with embodiments, transformation matrix K may be transmitted to the UE 300, e.g., as control information in the PDCCH 502 of the wireless communication system. The UE 300 constructs the codebook of the eNodeB or base station 200 that is adapted to the 'non-ideal' array response so as to allow for an improved beam refining, channel estimation and CSI feedback taking into account the real antenna array, thereby improving the accuracy of the channel estimation process, as well as the accuracy and amount of the CSI feedback 500. Further, in accordance with embodiments, the array geometry and configuration, like the number of antennas in various dimensions pertaining to the given array geometry, and details about antenna orientations in the array, may be transmitted to the UE along with the transformation matrix in the control information, to determine the 'ideal' response of the base station antenna array at the UE, so that the 'non-ideal'-response-adapted codebook can be obtained.

Now an embodiment for obtaining the codebook 212 adapted to 'non-ideal' array response at the base station 200 or at the UE 300 is described. Adapting the eNodeB codebook 208 to the 'non-ideal' array response is important in carrying out beamforming tasks in the antenna array 202. Using the codebook 208 based on the 'ideal' array response may result in unexpected and unnecessary beam patterns. The codebook design problem for a non-ideal array, whose response is known as a function of the direction of arrival or departure, and the model in FD-MIMO is assumed, in accordance with which a matrix of DFT-based steering vectors is maintained in the eNodeB. The matrix of steering vectors is maintained at the eNodeB, except they are adapted to the measured response of the array. As stated above, the matrices $\tilde{A}(\varphi,\theta) \in \mathbb{C}^{N_{Tx} \times MN}$ and $A(\varphi,\theta) \in \mathbb{C}^{N_{Tx} \times MN}$ are the measured 'non-ideal' response and 'ideal' response matrices of the eNodeB array, and both of them are known quantities at the eNodeB.

The codebook 208 in a FD-MIMO-like array includes beamforming weights for forming spatially separated electromagnetic beams for data transmission by the antenna array. The transformation matrix that approximates the 'non-ideal' eNodeB response is used to construct the codebook 212 that is adapted to the 'non-ideal' response and satisfies the power constraints of the base station antenna array. In accordance with embodiments, the following propositions for constructing the 'non-ideal'-response-adapted codebook satisfying the power constraints of the array may be considered:

Proposition 1: Codebook design in the presence of phase-shifters only The 'non-ideal'-response-adapted 'codebook' matrix $\Omega(\varphi,\theta) \in \mathbb{C}^{N_{Tx} \times MN}$ for a phase-shifter-only array circuitry may be obtained from the transformation matrix as follows:

$$\Omega(\varphi,\theta) = \angle[KA(\varphi,\theta)] \quad (15)$$

where the matrix product $K A(\varphi,\theta)$ represents the approximate 'non-ideal' array response and $\angle[.]$ denotes the angle of the argument. The alignment of the beamforming weights to the phases of the antenna response enables coherent combining of the signals along that particular direction.

Proposition 2: Codebook design in the presence of phase-shifters and amplifiers
In the presence of phase-shifters and amplifiers in the array circuitry for beamforming, the weights may be adapted to the array response by using the following codebook matrix $\Omega(\varphi,\theta) \in \mathbb{C}^{N_{Tx} \times MN}$ $$\Omega(\varphi,\theta) = K \cdot A(\varphi,\theta) \cdot D \quad (16)$$

Considering that the approximate 'non-ideal' array response matrix $\tilde{A}(\varphi,\theta) = K \cdot A(\varphi,\theta) \in \mathbb{C}^{N_{Tx} \times MN}$ may have the following structure $$\tilde{A}(\varphi,\theta) = [\tilde{a}(\varphi_1,\theta_1)\tilde{a}(\varphi_1,\theta_2) \ldots \tilde{a}(\varphi_m,\theta_n) \ldots \tilde{a}(\varphi_M,\theta_{N-1})\tilde{a}(\varphi_M,\theta_N)], \quad (17)$$

the matrix D introduced to normalize the entries in codebook so that the maximum amplitude of the coefficients in $\Omega(\varphi,\theta)$ is one is, $$D = \text{diag}\left[\frac{1}{\max_i |\tilde{a}_i(\varphi_1,\theta_1)|} \quad \frac{1}{\max_i |\tilde{a}_i(\varphi_1,\theta_2)|} \quad \cdots \quad \frac{1}{\max_i |\tilde{a}_i(\varphi_M,\theta_N)|}\right]. \quad (18)$$

Using the above normalization of the codebook entries, it is ensured that the amplitude gain per antenna port due to signal precoding is not larger than one.

In accordance with embodiments, the codebook may usually contain specific directions to form beams and hence it may not be necessary to consider the array response with its original angular resolution in space. The fixed beam directions considered for the array, along with the beam refining resolution set, determine the number of array response vectors that need to be transformed. In accordance with further embodiments, the directions in which the array has a 'null' (the array does not have any response, i.e., zero amplitude gain) may not be considered for transformation and the codebook.

Modifications in the precoding using the 'non-ideal'-response-adapted codebook in accordance with embodiments of the present invention are now described. The column vectors from the codebook $\Omega(\varphi,\theta) \in \mathbb{C}^{N_{Tx} \times MN}$ that are adapted to the 'non-ideal' response are the ones chosen for the beam steering vectors $s_d^p$, d=1, 2, ..., D and p=1, 2, ..., P in the precoder matrix $F_1$ in equation (2) instead of the vectors from the codebook 208 using the 'ideal' response (for e.g., 2D-DFT vectors in the case of UPA). The selection, combining and the co-phasing operations are maintained from the existing state-of-the-art two-stage precoder $F = F_1 F_2$.

In the block diagram of the downlink of a MIMO communication system employing the codebook-adaptation presented in FIG. 5, the original codebook 208 that corresponds to the 'ideal' response is modified to adapt to the 'non-ideal' response by the application of the transformation matrix K. For e.g., with UPAs, the 'non-ideal'-response-adapted codebook $\Omega(\varphi,\theta) \in \mathbb{C}^{N_{Tx} \times MN}$ is obtained using the expression in equation (15) or (16) by substituting the 2D-DFT-based codebook matrix in place of $A(\varphi,\theta) \in \mathbb{C}^{N_{Tx} \times MN}$.

Figure 6:
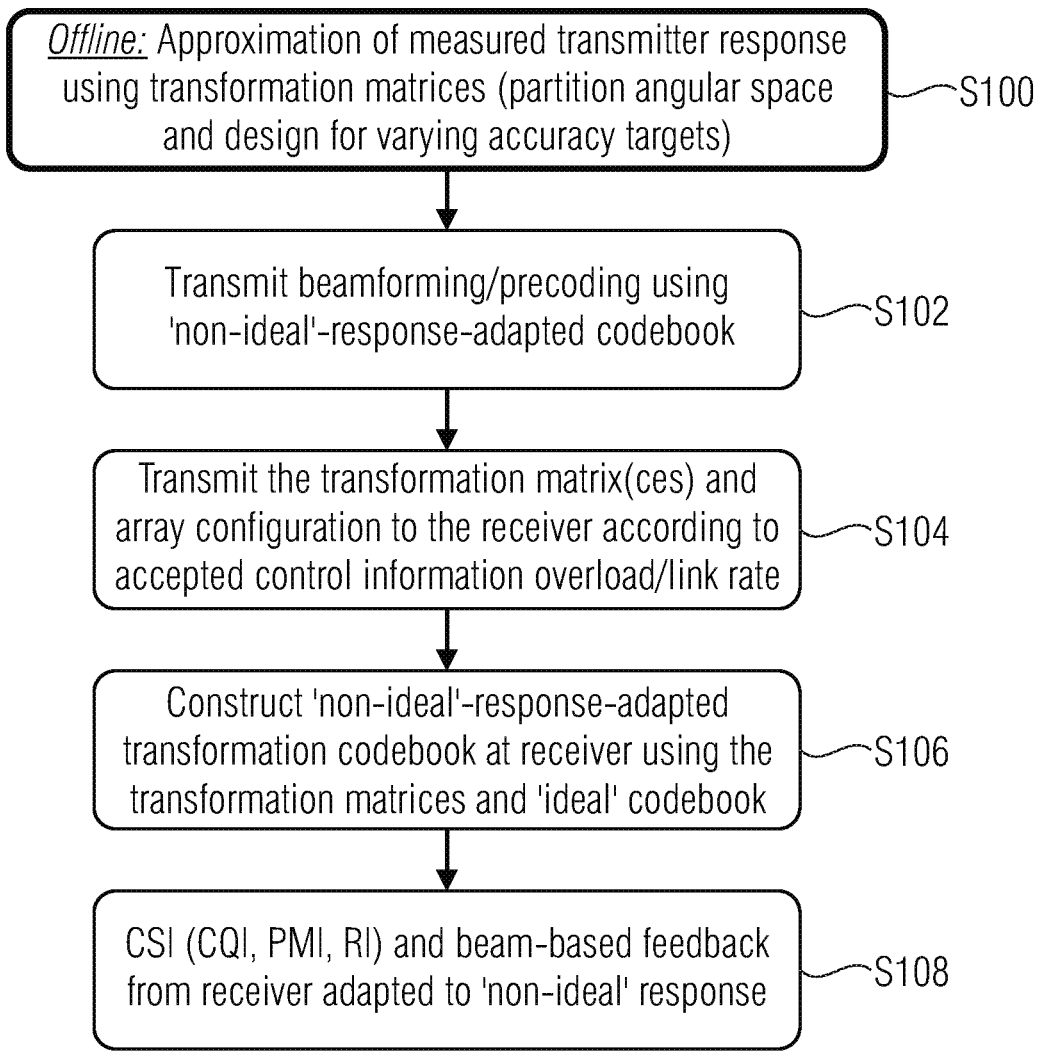
FIG. 6 shows a flowchart of a method in accordance with embodiments of the present invention for adapting a communication system, like the one in FIG. 5, to the 'non-ideal' response of the eNodeB array.

FIG. 6 is a flowchart of a method in accordance with embodiments of the present invention for adapting a communication system, like the one in FIG. 5, to the 'non-ideal' response of the eNodeB array. Following the approximation of the measured eNodeB response at S100, which may be performed offline, and which may use the transformation matrices (partition angular space and design for varying accuracy targets) in accordance with the embodiments described herein, at S102 the eNodeB (transmitter), e.g., the base station described above with reference to FIG. 5, performs the transmit beamforming/precoding 204 using the 'non-ideal'-response-adapted codebook 212. At S104 the transformation matrix(ces) and the configuration of the base station's antenna array 202 are transmitted to the UE 300 (receiver), e.g., according to an accepted control information overload/link rate of the control channel 502. At S106 the 'non-ideal'-response-adapted eNodeB codebook is constructed at the UE 300 using the transformation matrices and the 'ideal' codebook. At S108 the CSI (CQI, PMI, RI) and beam-based feedback 500 is transmitted from the UE 300, which may also be referred to as the UE adapted to 'non-ideal' response.

As the number of transformation matrices may increase due to multiple angular space partitions, the amount of control information data to be downloaded by the UE may also increases. Therefore, in accordance with embodiments a tradeoff is made between the accuracy of the transformation and the amount of control information transmitted. Further embodiments for the design of the transformation matrices and for the angular/frequency space partitions are now described.

Accuracy of Transformation (Proposition 1)

(1) In accordance with embodiments, the transformation matrix may be transmitted to the UE after the quantization. In such a case, a zero residual after transforming the 'ideal' response may be not possible even if the number of response vectors transformed is less than or equal to the number of antennas in the eNodeB antenna array. Therefore, while performing angular space partitions with a view of achieving a certain accuracy target (residual norm target), the effect of the quantization of the transformation matrix may also be taken into account.

(2) In accordance with embodiments, the angular partition may be performed by examining the correlation between the measured response vectors. Combining highly similar response vectors within the same transformation allows achieving better transformation accuracy even with a higher number of vectors transformed. An offline analysis of the 'non-ideal' response vectors is carried out to identify and separate highly correlated vectors and a common transformation matrix is applied to them. In this case, the accuracy may be obtained even when $N_{Tx}$ is much less than the number of vectors transformed.

Multiple Sets of Transformation Matrices (Proposition 2)

In accordance with embodiments, the eNodeB may maintain multiple sets of transformation matrices corresponding to multiple accuracy targets to achieve. The multiple transformation matrices may be provided for various rates of the established communication link and various control information overhead values possible.

Compression of Transformation Matrices (Proposition 3)

In accordance with embodiments, the transformation matrices $K_q$ may be projected onto an orthonormal basis B, $$K_q = BX_q, \quad q=1,\ldots,Q, \quad (19)$$

where the coefficient matrices $X_q$, $=1, \ldots, Q$ contain a large number of zeros, or close-to-zero elements. Hence, each matrix $K_q$ may be compactly represented by the basis B and an adequate number of non-zero coefficients of $X_q$. The 'largest' coefficients of the matrix $X_q$ may be quantized and transmitted to the UE. Based on the received matrices $X_q$ and the known basis B, the UE can recover the transformation matrices $K_q$. Exploiting such a structure for the compression of the matrices $K_q$ allows reducing the amount of control information data sent to the UE.

The compression of the transformation matrix by exploiting its structure is advantageous as the control information overhead may be reduced.

Kronecker Decomposition of Transformation Matrices (Proposition 4)

In accordance with embodiments, for UPAs where the rows and columns of antennas are designed in a way that the transformation of the non-idealities may be decoupled into separate components, the Kronecker model may be exploited to model the transformation matrix. This allows reducing the amount of control information that needs to be transmitted to the UE. The decomposition of the transformation matrix $K \in \mathbb{C}^{N_{Tx} \times N_{Tx}}$ using the Kronecker model (for a UPA as given in FIG. 3, considering only one of the antenna orientations) may be written as $$K = K^{(H)} \otimes K^{(V)}, \quad (20)$$

where $K^{(H)} \in \mathbb{C}^{N_{TX}^{(H)} \times N_{TX}^{(H)}}$ and $K^{(V)} \in \mathbb{C}^{N_{TX}^{(V)} \times N_{TX}^{(V)}}$ are the transformation matrices that transform the array response with respect to the horizontal and vertical antenna ports (rows and columns) of the array, respectively. Therefore, in case the eNodeB is equipped to transmit only the raw coefficients of the transformation matrix, exploiting the Kronecker model of the transformation matrix based on the array geometry allows reducing the number of coefficients transmitted from $(N_{TX}^{(H)} N_{TX}^{(V)})^2$ to $N_{TX}^{(H)^2} + N_{TX}^{(V)^2}$ (for the UPA in FIG. 3).

Extension to Polarimetric Codebook

In the embodiments described so far, no assumptions have been made with respect to the array geometry or the number of polarizations involved in the array, and the codebook and antenna response considerations described so far are non-polarimetric, i.e., the discussion of the array response or codebook was not discussed in the context of sensitivity of the antenna array to the polarization state of the transmitted or received wavefront. However, the present invention is not limited to such embodiments.

Although some codebook designs may be non-polarimetric, and, therefore, tend to ignore the practical aspects of the array in the design, the inventive approach in accordance with further embodiments considers the polarization-based response of the antennas as otherwise the beamforming efforts may turn out to be totally useless (see references [6] and [7]). Thus, in accordance with embodiments the responses of the antenna ports of the antenna array to the horizontal and vertical polarization of the transmitted/received wavefront are considered. For a calibrated array with $N_{Tx}$ antennas (in total, the count including all the P different orientations of antennas present in the array), $\tilde{A}_{(h)}(\varphi,\theta) \in \mathbb{C}^{N_{Tx} \times MN}$ and $\tilde{A}_{(v)}(\varphi,\theta) \in \mathbb{C}^{N_{Tx} \times MN}$ are obtained, the 'non-ideal' array response matrices for the horizontal and vertical polarizations of the transmitted/received wave.

The antennas in the array may be oriented in different directions to be sensitive to wavefronts with varying polarizations. Ideally, an antenna oriented along a particular direction should respond to a wavefront polarized only along a certain direction and reject all the components polarized in any other direction. In the literature, the direction of orientation of the antennas is the same as the polarization angle the antenna responds to and, therefore, the term 'polarization of the antenna' is used in place of 'orientation of the antenna, however, herein the term 'orientation' is used when referring to antennas to avoid any confusion with the wave polarization. In practice, however, due to the non-ideality of the antennas, the antennas tend to transmit/receive components of the wavefront across multiple polarizations. Therefore, in accordance with embodiments, the response of the antennas in the array across two orthogonal polarizations of the wavefront, horizontal and vertical, are considered for the polarimetric codebook design. The 'horizontal and vertical' mentioned herein are the polarizations of the wavefront, and not the horizontal and vertical orientations/polarizations of the antennas (or the horizontal and vertical arrangement of the antennas in a uniform planar array in FD-MIMO, for example). There is also a specific notation used to denote the response of the antenna to a particular wave polarization: the subscript/superscript '(h)' in a matrix or vector denotes the association with the horizontal polarization of the wavefront and the subscript/superscript '(v)' denotes the association with the vertical polarization of the wavefront. (This is different from the subscripts/superscripts 'H' and 'V' used for UPA to associate with the rows and columns of a UPA respectively).

The antenna array responses for the horizontal and vertical polarizations of the wavefront are approximated using two different transformation matrices:

$$\tilde{A}_{(h)}(\varphi,\theta) = K_{(h)} A(\varphi,\theta) + N_{(h)}$$

$$\tilde{A}_{(v)}(\varphi,\theta) = K_{(v)} A(\varphi,\theta) + N_{(v)} \quad (21)$$

The 'ideal' response of the array $A(\varphi,\theta)$ is assumed to be the same across the two wave polarizations. The transformation matrices corresponding to the two wave polarizations are determined individually using either of the linear models in equations (12) and (13). Both the transformation matrices, corresponding to the two polarizations of the wavefront $K_{p_H} \in \mathbb{C}^{N_{Tx} \times N_{Tx}}$ and $K_{p_V} \in \mathbb{C}^{N_{Tx} \times N_{Tx}}$ may be transmitted to the UE to adapt the codebook, to improve the beam refinement and channel estimation processes of the UE.

While a polarimetric response of the transmitter array is considered, a codebook that is polarimetric may be maintained. Similar to the non-polarimetric case, two propositions for the two polarizations of the received/transmitted wave.

Proposition 1: Polarimetric Codebook in the presence of phase-shifters only The 'codebook' matrices for the horizontal and vertical polarizations are respectively $$\Omega_{(h)}(\varphi,\theta) = \angle[K_{(h)} \cdot A(\varphi,\theta)],$$

$$\Omega_{(v)}(\varphi,\theta) = \angle[K_{(v)} \cdot A(\varphi,\theta)]. \quad (22)$$

Proposition 2: Polarimetric Codebook in the presence of phase-shifters and amplifiers In an array circuitry with phase-shifters and amplifiers, the codebook matrices corresponding to the horizontal and vertical wave polarizations are designed as follows:

$$\Omega_{(h)}(\varphi,\theta) = K_{(h)} \cdot A(\varphi,\theta) \cdot D_{(h)},$$

$$\Omega_{(v)}(\varphi,\theta) = K_{(v)} \cdot A(\varphi,\theta) \cdot D_{(v)} \quad (23)$$

respectively, where $K_{(h)} \cdot A(\varphi,\theta) = \check{A}_{(h)}(\varphi,\theta) \in \mathbb{C}^{N_{Tx} \times MN}$ and $K_{(v)} \cdot A(\varphi,\theta) = \check{A}_{(v)}(\varphi,\theta) \in \mathbb{C}^{N_{Tx} \times MN}$ are the array response approximates for the horizontal and the vertical wave polarizations, with $$\check{A}_{(h)}(\varphi,\theta) = [\check{a}^{(h)}(\varphi_1,\theta_1) \; \check{a}^{(h)}(\varphi_1,\theta_2) \ldots \quad (24)$$
$$\check{a}^{(h)}(\varphi_m,\theta_n) \ldots \check{a}^{(h)}(\varphi_M,\theta_{N-1}) \; \check{a}^{(h)}(\varphi_M,\theta_N)],$$

$$\check{A}_{(v)}(\varphi,\theta) = [\check{a}^{(v)}(\varphi_1,\theta_1) \; \check{a}^{(v)}(\varphi_1,\theta_2) \ldots \check{a}^{(v)}(\varphi_m,\theta_n) \ldots$$
$$\check{a}^{(v)}(\varphi_M,\theta_{N-1}) \; \check{a}^{(v)}(\varphi_M,\theta_N)].$$

The matrices $D_{(h)} \in \mathbb{C}^{MN \times MN}$ and $D_{(v)} \in \mathbb{C}^{MN \times MN}$ contain the coefficients to normalize the coefficients of the codebook vectors:

$$D_{(h)} = \quad (25)$$

$$\text{diag}\left[\frac{1}{\max_i |\check{a}_i^{(h)}(\varphi_1,\theta_1)|} \; \frac{1}{\max_i |\check{a}_i^{(h)}(\varphi_1,\theta_2)|} \ldots \frac{1}{\max_i |\check{a}_i^{(h)}(\varphi_M,\theta_N)|}\right],$$

$$D_{(v)} =$$

$$\text{diag}\left[\frac{1}{\max_i |\check{a}_i^{(v)}(\varphi_1,\theta_1)|} \; \frac{1}{\max_i |\check{a}_i^{(v)}(\varphi_1,\theta_2)|} \ldots \frac{1}{\max_i |\check{a}_i^{(v)}(\varphi_M,\theta_N)|}\right].$$

In accordance with embodiments, the precoder design for a polarimetric codebook may be modified as follows. Considering the use of a polarimetric codebook, a precoder design that incorporates the polarimetric nature of the array response into the codebook is employed. The polarimetric precoder design for the antenna array with $N_{Tx}$ antenna ports per antenna orientation, with P different antenna orientations is similar to the one in equation (2), except the array steering vectors in the matrix $F_1$ may include for the two wave polarizations considered—horizontal and vertical.

$$F = \quad (26)$$

$$F_1 F_2 = \begin{bmatrix} A_1^1 & A_2^1 & \ldots & A_D^1 & \ldots & & 0 \\ & \vdots & & \ddots & & \vdots & \\ 0 & & \ldots & A_1^P & A_2^P & \ldots & A_D^P \end{bmatrix} [c^1 \; \ldots \; c^{D'}].$$

The matrix $A_d^p \in \mathbb{C}^{N_{Tx} \times 2}$, d=1, 2, . . . , D and p=1, 2, . . . , P has the structure $[s_{(h),d}^p \; s_{(v),d}^p]$ where each column corresponds to the array steering vector for the horizontal and the vertical polarized wave respectively. The index p refers to steering the beam along a certain i-th direction from selected D directions. The other index and the superscript, p represents the index of the orientation of the antennas directing the beams. The possible candidates for $s_{(h),d}^p$ are the columns of the codebook matrix corresponding to the horizontal wave polarization $\Omega_{(h)}(\varphi,\theta)$ and the columns of the codebook for the vertical wave polarization $\Omega_{(v)}(\varphi,\theta)$ are the possible candidates for the vectors $s_{(v),d}^p$.

The matrix $F_2 \in \mathbb{C}^{2 \cdot D \cdot P \times D'}$ has a structure similar to the non-polarimetric precoder structure and is used for selection/combining/co-phasing between antenna orientations and wave polarizations. The building blocks of $F_2$, in the polarimetric case, are the selection vectors $\ddot{e}^{(d)} \in \mathbb{C}^{2 \cdot D \times 1}$, d=1, 2, . . . , 2D, which like the vectors $e^{(d)} \in \mathbb{C}^{2 \cdot D \times 1}$ in the non-polarimetric case described above contain one of the d-th position of the vector and zeros elsewhere. From the structure of the matrix $F_1$, it may be seen that the steering vectors corresponding to the horizontal polarization occupy the odd column positions and the ones corresponding to the vertical polarization occupy the even column positions. Therefore, to select the horizontal polarization of a particular d-th direction from $F_1$, the selection vector $\ddot{e}^{(2d-1)}$ may be used. In addition, when combining the steering vectors for a particular d-th direction from both horizontal and vertical wave polarizations, the selection vectors of adjacent positions $\ddot{e}^{(2d-1)}$ and $\tilde{e}^{(2d)}$ may be used together. Therefore, more than one column may be used to select a beam directed towards a particular direction and wave polarization. Hence, in this case, the variable D' does not equal the number of effective beams formed, but the number of effective beams formed per wave polarization. The table in FIG. 7 includes examples for the matrix $F_2$ that are used for various beam formation functionalities.

The structure of the matrix $F_2$, i.e., the building blocks of $F_2$ may be the same selection vectors from the non-polarimetric precoder discussed above. However, there is one more hierarchy of beam selection/combining/co-phasing with the sensitivity of the antennas to different wave polarizations involved in the precoder. Hence, there are many more choices to be made in the combination of the steering vectors. This improves the flexibility in beamforming and also a practical precoding model that obeys the physics involved with the antennas.

In accordance with embodiments, along with the transmission of the transformation matrices corresponding to the horizontal and vertical polarizations of the antenna array at the transmitter, like the base station, to the receiver, like the UE, the transmitter antenna array geometry, array configuration and antenna orientation information may also be transmitted to determine the 'ideal' transmitter array response at the receiver, so that the codebook can be obtained.

Although the embodiments above have been described for a downlink data transmission in which the base station operates as a transmitter and the UE operates as a receiver, the inventive approach is not limited to such embodiments. In accordance with other embodiments, the inventive approach is equally applicable in an uplink (UL) transmission of the mobile multiple input multiple output communication system, e.g., the communication link carrying data traffic from the mobile user equipment (UE) to the base station (eNodeB). In such embodiments the UE operates as the transmitter and the base station operates as the receiver.

Although the embodiments above have been described with reference to a 1-dimensional antenna array, like a Uniform Linear Array, or a 2-dimensional antenna array, like a Uniform Planar Array, the inventive approach is not limited to such embodiments. In accordance with other embodiments, the inventive approach is equally applicable to any antenna array, like a 1-dimensional antenna array, or a 2-dimensional antenna array or a 3-dimensional antenna array of any array configuration.

Further embodiments of the present invention are now described.

A $1^{st}$ embodiment provides a transmitter, comprising an antenna array having a plurality of antennas for a wireless communication with one or more receivers; and a precoder connected to the antenna array, the precoder to apply a set of beamforming weights to the antenna array, the set of beamforming weights selected from a codebook to form by the antenna array one or more transmit/receive beams or nulls pointing in selected directions; wherein the codebook includes a plurality of sets of beamforming weights for a plurality of directions, wherein the beamforming weights in the codebook are based on a first antenna array response matrix, the first antenna array response matrix defined by a second antenna array response matrix and one or more transformation matrices, and wherein the first antenna array response matrix contains, for a plurality of directions, first array response vectors of the antenna array, the second antenna array response matrix contains, for one or more of the plurality of directions, second array response vectors of the antenna array, the second array response vectors determined using a model of the antenna array, and the one or more transformation matrices describing one or more characteristics of the antenna array.

A $2^{nd}$ embodiment provides the transmitter of the $1^{st}$ embodiment, wherein the one or more transformation matrices are based on the second antenna array response matrix and a measured antenna array response matrix containing, for some or all of the plurality of directions, measured array response vectors determined from a measurement of the antenna array.

A $3^{rd}$ embodiment provides the transmitter of the $1^{st}$ or $2^{nd}$ embodiments, wherein the model of the antenna array is based on identical, omnidirectional antennas with ideal antenna placement, no electromagnetic coupling between the antennas or other practical imperfections in the array circuitry or the antennas, and the one or more transformation matrices consider the directional and non-identical nature of the antennas in the antenna array, electromagnetic coupling between the antennas and other practical imperfections in the antenna array.

A $4^{th}$ embodiment provides the transmitter of one of the $1^{st}$ to $3^{rd}$ embodiments, wherein the antenna array comprises a 1-dimensional antenna array, or a 2-dimensional antenna array or a 3-dimensional antenna array.

A $5^{th}$ embodiment provides the transmitter of the $4^{th}$ embodiment, wherein the 2-dimensional antenna array or the 3-dimensional antenna array controls the radio wave for beamforming both in the vertical (elevation) direction and the horizontal (azimuth) direction, and the precoder has a dual-stage structure, the first stage containing the sets of beamforming weights based on the codebook to be applied to each antenna of the antenna array, the second stage containing coefficients that select and/or linearly combine the beams defined by the first stage to obtain a desired beam pattern.

A $6^{th}$ embodiment provides the transmitter of one of the $1^{st}$ to $5^{th}$ embodiments, wherein the first antenna array response matrix is linearly modeled/transformed using the second antenna array response matrix and the one or more transformation matrices.

A $7^{th}$ embodiment provides the transmitter of the $6^{th}$ embodiment, wherein linearly modeling the first antenna array response matrix includes using a further matrix, the further matrix to transform the response of omnidirectional antennas of the antenna array for a specific direction to a directional response of measured antennas of the antenna array.

A $8^{th}$ embodiment provides the transmitter of the $6^{th}$ or $7^{th}$ embodiments, wherein the second antenna array response matrix is defined by a 2D-DFT based matrix.

A $9^{th}$ embodiment provides the transmitter of one of the $1^{st}$ to $8^{th}$ embodiments, wherein the one or more transformation matrices are smaller in size than the first antenna array response matrix.

A $10^{th}$ embodiment provides the transmitter of one of the $1^{st}$ to $9^{th}$ embodiments, wherein the codebook is obtained from a first codebook modified using the one or more transformation matrices, the first codebook defined using the second antenna array response matrix.

A $11^{th}$ embodiment provides the transmitter of one of the $1^{st}$ to $10^{th}$ embodiments, wherein a single transformation matrix is applied to the entire angular space and/or the entire frequency space of the antenna array, the angular space defined by azimuth and elevation angles.

A $12^{th}$ embodiment provides the transmitter of one of the $1^{st}$ to $10^{th}$ embodiments, wherein the angular space and/or the frequency space is partitioned into a plurality of smaller overlapping or non-overlapping partitions, the angular space defined by azimuth and elevation angles, and for each partition of the angular space and/or the frequency space the first antenna array response matrix for the partition is linearly modeled using the second antenna array response matrix for the partition and a transformation matrix for the partition.

A $13^{th}$ embodiment provides the transmitter of the $12^{th}$ embodiment, wherein the angular space is partitioned into a plurality of smaller overlapping or non-overlapping partitions to achieve predefined targets for the accuracy of modeling/transforming of the first antenna array response matrix.

A 14$^{th}$ embodiment provides the transmitter of the 12$^{th}$ or 13$^{th}$ embodiments, wherein the angular space is partitioned responsive to the correlation between the first array response vectors defining the first antenna array response matrices for a plurality of partitions to identify and separate highly correlated first antenna array response matrices and to apply one or more common transformation matrices for the correlated first antenna array response matrices.

A 15$^{th}$ embodiment provides the transmitter of one of the 12$^{th}$ to 14$^{th}$ embodiments, wherein the angular space is partitioned dependent on the effect of quantization of the entries of the one or more transformation matrices.

A 16$^{th}$ embodiment provides the transmitter of one of the 12$^{th}$ to 15$^{th}$ embodiments, wherein the transmitter is configured to maintain a plurality of transformation matrices for a plurality of sets of partitions of the angular space and/or the frequency space of the antenna array to support varying data rates for the wireless communication between the transmitter and the one or more receivers and/or varying control information overhead values.

A 17$^{th}$ embodiment provides the transmitter of one of the 12$^{th}$ to 16$^{th}$ embodiments, wherein the antenna array comprises a 2-dimensional antenna array or a 3-dimensional antenna array, the transformation matrix for a particular partition of the angular space and/or the frequency space is expressed as a Kronecker product of a first matrix and a second matrix, and the first matrix is the transformation matrix of the antenna array considering the antenna ports along a first dimension of the antenna array, and the second matrix is the transformation matrix corresponding to the antenna ports in the antenna array along a second dimension perpendicular to the first dimension.

A 18$^{th}$ embodiment provides the transmitter of one of the 1$^{st}$ to 17$^{th}$ embodiments, wherein the transmitter is configured to compress the one or more transformation matrices by projecting it/them on a basis where the one or more transformation matrices are known to be compressible so as to obtain a first set of coefficients having a first magnitude, and a second set of coefficients having a second magnitude, the first magnitude being higher than the second magnitude, and the first set of coefficients constitute the compressed form of the one or more transformation matrices.

A 19$^{th}$ embodiment provides the transmitter of one of the 1$^{st}$ to 19$^{th}$ embodiments, wherein the first antenna array response matrix comprises a first antenna array response submatrix and a second antenna array response submatrix, the first submatrix contains, for a plurality of directions, the array response vectors of all antenna ports in the antenna array with respect to the horizontal polarization of an wavefront, and the second submatrix contains, for the same directions as in the first submatrix, the array of response vectors of all antenna ports in the antenna array to the vertical polarization of the wavefront.

A 20$^{th}$ embodiment provides the transmitter of the 19$^{th}$ embodiment, comprising a first transformation matrix corresponding to the horizontal polarization, the first submatrix obtained by linear modeling the second antenna array response matrix using the first transformation matrix, and a second transformation matrix corresponding to the vertical polarization, the second submatrix obtained by linear modeling the second antenna array response matrix using the second transformation matrix.

A 21$^{st}$ embodiment provides the transmitter of the 19$^{th}$ or 20$^{th}$ embodiments, comprising a polarimetric codebook, the polarimetric codebook containing a first sub-codebook and a second sub-codebook, wherein the first sub-codebook contains beamforming weights for all antenna ports with respect to the horizontal polarization, the beamforming weights obtained from a first codebook modified using the first transformation matrix, and the second sub-codebook contains beamforming weights for all antenna ports with respect to the vertical polarization, the beamforming weights obtained from the first codebook modified using the second transformation matrix.

A 22$^{nd}$ embodiment provides the transmitter of one of the 1$^{st}$ to 21$^{st}$ embodiments, wherein the transmitter is configured to transmit the one or more transformation matrices to the one or more receivers.

A 23$^{th}$ embodiment provides the transmitter of the 22$^{nd}$ embodiment, wherein the transmitter is configured to transmit the one or more transformation matrices as part of control information to the receiver.

A 24$^{th}$ embodiment provides a receiver, comprising an antenna for a wireless communication with a transmitter; and a signal processor to receive and process a radio signal received at the antenna via a radio channel; wherein the receiver is configured to store and/or calculate a codebook including a plurality of sets of beamforming weights for a plurality of directions, wherein the beamforming weights in the codebook are based on a first antenna array response matrix of an antenna array of the transmitter, the first antenna array response matrix containing first array response vectors for a plurality of directions, the first array response vectors determined using a model of the antenna array of the transmitter, and the transmitter selecting a set of beamforming weights from the codebook to form by the antenna array a transmit/receive beam pointing in a selected direction, wherein the receiver is configured to modify the codebook using one or more transformation matrices received from the transmitter, and wherein the one or more transformation matrices describe one or more characteristics of the antenna array of the antenna array of the transmitter.

A 25$^{th}$ embodiment provides the receiver of the 24$^{th}$ embodiment, wherein the receiver is configured for a wireless communication with a transmitter of one of the 1$^{st}$ to 23$^{rd}$ embodiments.

A 26$^{th}$ embodiment provides the receiver of the 24$^{th}$ or 25$^{th}$ embodiments, comprising a channel estimator to estimate a state of the radio channel, wherein the receiver is configured to determine, based on the radio channel estimation and the modified codebook, a feedback to the transmitter, the transmitter selecting, on the basis of the feedback, a set of beamforming weights from the codebook to form the transmit/receive beam, and wherein the feedback includes control signals on the basis of which the transmitter selects a set of beamforming weights, or the feedback transmits a set of beamforming weights from the receiver to the transmitter.

A 27$^{th}$ embodiment provides a wireless communication network, comprising a transmitter of one of the 1$^{st}$ to 23$^{rd}$ embodiments; and one or more receivers of one of the 24$^{th}$ to 26$^{th}$ embodiments.

A 28$^{th}$ embodiment provides the wireless communication network of the 27$^{th}$ embodiment, comprising a cellular network, a wireless local area network or a wireless sensor system.

A 29$^{th}$ embodiment provides the wireless communication network of the 27$^{th}$ or 28$^{th}$ embodiments, wherein the transmitter comprises a base station serving a user equipment, or a user equipment served by a base station, and the receiver comprises a base station serving a user equipment, or a user equipment served by a base station.

A 30$^{th}$ embodiment provides the wireless communication network of the 29$^{th}$ embodiment, wherein the user equipment comprises a mobile terminal, or an IoT device, or a device implemented inside a moving vehicle, like a moving vehicle, e.g., a car or a robot, or inside a flying device, e.g., an unmanned aerial vehicle or a plane.

A 31$^{th}$ embodiment provides the wireless communication network of one of the 27$^{th}$ to 30$^{th}$ embodiments, using an IFFT (Inverse Fast Fourier Transform) based signal, wherein the IFFT based signal includes OFDM with CP, DFT-s-OFDM with CP, IFFT-based waveforms without CP, f-OFDM, FBMC, GFDM or UFMC.

A 32$^{nd}$ embodiment provides a method, comprising modifying a codebook used by precoder of a transmitter, the transmitter including an antenna array having a plurality of antennas for a wireless communication with one or more receivers, and the precoder connected to the antenna array, wherein the codebook includes a plurality of sets of beamforming weights for a plurality of directions, the beamforming weights in the codebook based on a first antenna array response matrix, the first antenna array response matrix contains, for a plurality of directions, first array response vectors determined using a model of the antenna array, and wherein the codebook is modified using one or more transformation matrices, the one or more transformation matrices describing one or more characteristics of the antenna array.

A 33$^{th}$ embodiment provides the method of the 32$^{nd}$ embodiment, comprising transmitting the one or more transformation matrices to the one or more receivers to allow the receiver to build a codebook at the receiver.

A 34$^{th}$ embodiment provides a method, comprising receiving and processing, at a receiver having an antenna for a wireless communication with a transmitter, a radio signal received at the antenna via a radio channel, the radio signal including one or more transformation matrices; and modifying, using the one or more transformation matrices, a codebook stored or calculated at the receiver and including a plurality of sets of beamforming weights for a plurality of directions, the beamforming weights in the codebook being based on a first antenna array response matrix of an antenna array of the transmitter, the first antenna array response matrix containing first array response vectors for a plurality of directions, the first array response vectors determined using a model of the antenna array of the transmitter, and the transmitter selecting a set of beamforming weights from the codebook to form by an antenna array a transmit/receive beam pointing in a selected direction, wherein the one or more transformation matrices describe one or more characteristics of the antenna array.

A 35$^{th}$ embodiment provides a non-transitory computer program product comprising a computer readable medium storing instructions which, when executed on a computer, perform the method of one of the 32$^{nd}$ to 34$^{th}$ embodiments.

Although some aspects of the described concept have been described in the context of an apparatus, it is clear that these aspects also represent a description of the corresponding method, where a block or a device corresponds to a method step or a feature of a method step. Analogously, aspects described in the context of a method step also represent a description of a corresponding block or item or feature of a corresponding apparatus.

Various elements and features of the present invention may be implemented in hardware using analog and/or digital circuits, in software, through the execution of instructions by one or more general purpose or special-purpose processors, or as a combination of hardware and software. For example, embodiments of the present invention may be implemented in the environment of a computer system or another processing system. FIG. 8 illustrates an example of a computer system 600. The units or modules as well as the steps of the methods performed by these units may execute on one or more computer systems 600. The computer system 600 includes one or more processors 602, like a special purpose or a general purpose digital signal processor. The processor 602 is connected to a communication infrastructure 604, like a bus or a network. The computer system 600 includes a main memory 606, e.g., a random access memory (RAM), and a secondary memory 608, e.g., a hard disk drive and/or a removable storage drive. The secondary memory 608 may allow computer programs or other instructions to be loaded into the computer system 600. The computer system 600 may further include a communications interface 610 to allow software and data to be transferred between computer system 600 and external devices. The communication may be in the form electronic, electromagnetic, optical, or other signals capable of being handled by a communications interface. The communication may use a wire or a cable, fiber optics, a phone line, a cellular phone link, an RF link and other communications channels 612.

The terms "computer program medium" and "computer readable medium" are used to generally refer to tangible storage media such as removable storage units or a hard disk installed in a hard disk drive. These computer program products are means for providing software to the computer system 600. The computer programs, also referred to as computer control logic, are stored in main memory 606 and/or secondary memory 608. Computer programs may also be received via the communications interface 610. The computer program, when executed, enables the computer system 600 to implement the present invention. In particular, the computer program, when executed, enable processor 602 to implement the processes of the present invention, such as any of the methods described herein. Accordingly, such a computer program may represent a controller of the computer system 600. Where the disclosure is implemented using software, the software may be stored in a computer program product and loaded into computer system 600 using a removable storage drive, an interface, like communications interface 610.

The implementation in hardware or in software may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier. In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

Yet further embodiments are now described.

A $1^{st}$ embodiment provides a transmitter, comprising:
an antenna array having a plurality of antennas for a wireless communication with one or more receivers; and
a precoder connected to the antenna array, the precoder to apply a set of beamforming weights to the antenna array, the set of beamforming weights selected from a codebook to form by the antenna array one or more transmit/receive beams or nulls pointing in selected directions;
wherein the codebook includes a plurality of sets of beamforming weights for a plurality of directions,
wherein the beamforming weights in the codebook are based on a first antenna array response matrix ($\tilde{A}(\varphi,\theta)$), the first antenna array response matrix ($\tilde{A}(\varphi,\theta)$) defined by a second antenna array response matrix ($A(\varphi,\theta)$) and one or more transformation matrices ($K,K_q$), and
wherein the first antenna array response matrix ($\tilde{A}(\varphi,\theta)$) contains, for a plurality of directions, first array response vectors ($\tilde{a}(\varphi_m,\theta_n)$) of the antenna array, the second antenna array response matrix ($A(\varphi,\theta)$) contains, for one or more of the plurality of directions, second array response vectors of the antenna array, the second array response vectors determined using a model of the antenna array, and the one or more transformation matrices ($K,K_q$) describing one or more characteristics of the antenna array.

A $2^{nd}$ embodiment provides the transmitter of the $1^{st}$ embodiment, wherein
the one or more transformation matrices ($K,K_q$) are based on the second antenna array response matrix ($A(\varphi,\theta)$) and a measured antenna array response matrix containing, for some or all of the plurality of directions, measured array response vectors determined from a measurement of the antenna array.

A $3^{rd}$ embodiment provides the transmitter of the $1^{st}$ embodiment or of the $2^{nd}$ embodiment, wherein the model of the antenna array is based on identical, omnidirectional antennas with ideal antenna placement, no electromagnetic coupling between the antennas or other practical imperfections in the array circuitry or the antennas, and
the one or more transformation matrices ($K,K_q$) consider the directional and non-identical nature of the antennas in the antenna array, electromagnetic coupling between the antennas and other practical imperfections in the antenna array.

A $4^{th}$ embodiment provides the transmitter of any one of the $1^{st}$ to $3^{rd}$ embodiments, wherein
the antenna array comprises a 1-dimensional antenna array, or a 2-dimensional antenna array or a 3-dimensional antenna array,
the 2-dimensional antenna array or the 3-dimensional antenna array controls the radio wave for beamforming both in the vertical (elevation) direction and the horizontal (azimuth) direction, and
the precoder has a dual-stage structure, the first stage containing the sets of beamforming weights based on the codebook to be applied to each antenna of the antenna array, the second stage containing coefficients that select and/or linearly combine the beams defined by the first stage to obtain a desired beam pattern.

A $5^{th}$ embodiment provides the transmitter of any one of the $1^{st}$ to $4^{th}$ embodiments, wherein
the first antenna array response matrix ($\tilde{A}(\varphi,\theta)$) is linearly modeled/transformed using the second antenna array response matrix ($A(\varphi,\theta)$) and the one or more transformation matrices ($K,K_q$).

A $6^{th}$ embodiment provides the transmitter of the $5^{th}$ embodiment, wherein
linearly modeling the first antenna array response matrix ($\tilde{A}(\varphi,\theta)$) includes using a further matrix ($\Gamma$), the further matrix ($\Gamma$) to transform the response of omnidirectional antennas of the antenna array for a specific direction to a directional response of measured antennas of the antenna array.

A $7^{th}$ embodiment provides the transmitter of the $5^{th}$ embodiment or the $6^{th}$ embodiment, wherein
the second antenna array response matrix ($A(\varphi,\theta)$) is defined by a 2D-DFT based matrix.

An $8^{th}$ embodiment provides the transmitter of any one of the $1^{st}$ to $7^{th}$ embodiments, wherein
the one or more transformation matrices ($K,K_q$) are smaller in size than the first antenna array response matrix ($\tilde{A}(\varphi,\theta)$).

A $9^{th}$ embodiment provides the transmitter of any one of the $1^{st}$ to $8^{th}$ embodiments, wherein
the codebook is obtained from a first codebook modified using the one or more transformation matrices ($K,K_q$), the first codebook defined using the second antenna array response matrix ($A(\varphi,\theta)$).

A $10^{th}$ embodiment provides the transmitter of any one of the $1^{st}$ to $9^{th}$ embodiments, wherein
a single transformation matrix ($K$) is applied to the entire angular space and/or the entire frequency space of the antenna array, the angular space defined by azimuth and elevation angles ($\varphi,\theta$), or
the angular space and/or the frequency space is partitioned into a plurality of smaller overlapping or non-overlapping partitions, the angular space defined by azimuth and elevation angles ($\varphi,\theta$), wherein for each partition of the angular space and/or the frequency space the first antenna array response matrix ($\tilde{A}(\varphi,\theta)$) for the partition is linearly modeled using the second antenna array response matrix $(A(\varphi,\theta))$ for the partition and a transformation matrix $(K_q)$ for the partition.

An 11$^{th}$ embodiment provides the transmitter of the 10$^{th}$ embodiment, wherein
the angular space is partitioned into a plurality of smaller overlapping or non-overlapping partitions to achieve predefined targets for the accuracy of modeling/transforming of the first antenna array response matrix $(\tilde{A}(\varphi,\theta))$.

A 12$^{th}$ embodiment provides the transmitter of the 10$^{th}$ embodiment or of the 11$^{th}$ embodiment, wherein
the antenna array comprises a 2-dimensional antenna array or a 3-dimensional antenna array,
the transformation matrix $(K_q)$ for a particular partition of the angular space and/or the frequency space is expressed as a Kronecker product of a first matrix $(K^{(H)})$ and a second matrix $(K^{(V)})$, and
the first matrix $(K^{(H)})$ is the transformation matrix of the antenna array considering the antenna ports along a first dimension of the antenna array, and the second matrix $(K^{(V)})$ is the transformation matrix corresponding to the antenna ports in the antenna array along a second dimension perpendicular to the first dimension.

A 13$^{th}$ embodiment provides the transmitter of any one of the 1$^{st}$ to 12$^{th}$ embodiments, wherein
the transmitter is configured to compress the one or more transformation matrices $(K, K_q)$ by projecting it/them on a basis where the one or more transformation matrices $(K, K_q)$ are known to be compressible so as to obtain a first set of coefficients having a first magnitude, and a second set of coefficients having a second magnitude, the first magnitude being higher than the second magnitude, and
the first set of coefficients constitute the compressed form of the one or more transformation matrices $(K, K_q)$.

A 14$^{th}$ embodiment provides the transmitter of any one of the 1$^{st}$ to 13$^{th}$ embodiments, wherein
the first antenna array response matrix $(\tilde{A}(\varphi,\theta))$ comprises a first antenna array response submatrix $(\tilde{A}_{(h)}(\varphi,\theta))$ and a second antenna array response submatrix $(\tilde{A}_{(p)}(\varphi,\theta))$,
the first submatrix $(\tilde{A}_{(h)}(\varphi,\theta))$ contains, for a plurality of directions, the array response vectors of all antenna ports in the antenna array with respect to the horizontal polarization of a wavefront, and
the second submatrix $(\tilde{A}_{(p)}(\varphi,\theta))$ contains, for the same directions as in the first submatrix $(\tilde{A}_{(h)}(\varphi,\theta))$, the array of response vectors of all antenna ports in the antenna array to the vertical polarization of the wavefront.

A 15$^{th}$ embodiment provides the transmitter of the 14$^{th}$ embodiment, comprising:
a first transformation matrix $(K_{(h)})$ corresponding to the horizontal polarization, the first submatrix $(\tilde{A}_{(h)}(\varphi,\theta))$ obtained by linear modeling the second antenna array response matrix $(A(\varphi,\theta))$ using the first transformation matrix $(K_{(h)})$, and
a second transformation matrix $(K_{(v)})$ corresponding to the vertical polarization, the second submatrix $(\tilde{A}_{(v)}(\varphi,\theta))$ obtained by linear modeling the second antenna array response matrix $(A(\varphi,\theta))$ using the second transformation matrix $(K_{(v)})$.

A 16$^{th}$ embodiment provides the transmitter of the 14$^{th}$ embodiment or of the 15$^{th}$ embodiment, wherein
the codebook comprises a polarimetric codebook, the polarimetric codebook containing a first sub-codebook and a second sub-codebook, wherein
the first sub-codebook contains beamforming weights for all antenna ports with respect to the horizontal polarization, the beamforming weights obtained from a first codebook modified using the first transformation matrix $(K_{(h)})$, and
the second sub-codebook contains beamforming weights for all antenna ports with respect to the vertical polarization, the beamforming weights obtained from the first codebook modified using the second transformation matrix $(K_{(v)})$.

A 17$^{th}$ embodiment provides the transmitter of any one of the 1$^{st}$ to 16$^{th}$ embodiments, wherein the transmitter is configured to transmit the one or more transformation matrices $(K, K_q)$ to the one or more receivers as part of control information for the receiver.

An 18$^{th}$ embodiment provides a receiver, comprising:
an antenna for a wireless communication with a transmitter; and
a signal processor to receive and process a radio signal received at the antenna via a radio channel;
wherein the receiver is configured to store and/or calculate a codebook including a plurality of sets of beamforming weights for a plurality of directions,
wherein the beamforming weights in the codebook are based on a first antenna array response matrix $(A(\varphi,\theta))$ of an antenna array of the transmitter, the first antenna array response matrix $(A(\varphi,\theta))$ containing first array response vectors $(a(\varphi_m,\theta_n))$ for a plurality of directions, the first array response vectors $(a(\varphi_m,\theta_n))$ determined using a model of the antenna array of the transmitter, and the transmitter selecting a set of beamforming weights from the codebook to form by the antenna array a transmit/receive beam pointing in a selected direction,
wherein the receiver is configured to modify the codebook using one or more transformation matrices $(K, K_q)$ received from the transmitter, and
wherein the one or more transformation matrices $(K, K_q)$ describe one or more characteristics of the antenna array of the transmitter.

A 19$^{th}$ embodiment provides the receiver of the 24$^{th}$ embodiment, wherein the receiver is configured for a wireless communication with a transmitter of any one of the 1$^{st}$ to 17$^{th}$ embodiments.

A 20$^{th}$ embodiment provides the receiver of the 18$^{th}$ embodiment or of the 19$^{th}$ embodiment, comprising:
a channel estimator to estimate a state of the radio channel,
wherein the receiver is configured to determine, based on the radio channel estimation and the modified codebook, a feedback to the transmitter, the transmitter selecting, on the basis of the feedback, a set of beamforming weights from the codebook to form the transmit/receive beam, and
wherein the feedback includes control signals on the basis of which the transmitter selects a set of beamforming weights, or the feedback transmits a set of beamforming weights from the receiver to the transmitter.

A 21$^{st}$ embodiment provides a wireless communication network, comprising:
a transmitter of any one of the 1$^{st}$ to 17$^{th}$ embodiments; and
one or more receivers of any one of the 18$^{th}$ to 20$^{th}$ embodiments.

A 22$^{nd}$ embodiment provides the wireless communication network of the 21$^{st}$ embodiment, wherein
the transmitter comprises a base station serving a user equipment, or a user equipment served by a base station, or the receiver comprises a base station serving a user equipment, or a user equipment served by a base station.

A 23$^{rd}$ embodiment provides a method, comprising:
modifying a codebook used by a precoder of a transmitter, the transmitter including an antenna array having a plurality of antennas for a wireless communication with one or more receivers, and the precoder connected to the antenna array,
wherein the codebook includes a plurality of sets of beamforming weights for a plurality of directions, the beamforming weights in the codebook based on a first antenna array response matrix ($A(\varphi,\theta)$), the first antenna array response matrix ($A(\varphi,\theta)$) contains, for a plurality of directions, first array response vectors ($a(\varphi_m,\theta_n)$) determined using a model of the antenna array, and
wherein the codebook is modified using one or more transformation matrices ($K,K_q$), the one or more transformation matrices ($K,K_q$) describing one or more characteristics of the antenna array.

A 24$^{th}$ embodiment provides a method, comprising:
receiving and processing, at a receiver having an antenna for a wireless communication with a transmitter, a radio signal received at the antenna via a radio channel, the radio signal including one or more transformation matrices ($K,K_q$); and
modifying, using the one or more transformation matrices ($K,K_q$), a codebook stored or calculated at the receiver and including a plurality of sets of beamforming weights for a plurality of directions, the beamforming weights in the codebook being based on a first antenna array response matrix ($A(\varphi,\theta)$) of an antenna array of the transmitter, the first antenna array response matrix ($A(\varphi,\theta)$) containing first array response vectors ($a(\varphi_m,\theta_n)$) for a plurality of directions, the first array response vectors ($a(\varphi_m,\theta_n)$) determined using a model of the antenna array of the transmitter, and the transmitter selecting a set of beamforming weights from the codebook to form by an antenna array a transmit/receive beam pointing in a selected direction,
wherein the one or more transformation matrices ($K,K_q$) describe one or more characteristics of the antenna array.

A 25$^{th}$ embodiment provides a non-transitory computer program product comprising a computer readable medium storing instructions which, when executed on a computer, perform the method of the 23$^{rd}$ embodiment or of the 24$^{th}$ embodiment.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCES

[1] 3GPP TS 36.211 V10.7.0, "3rd Generation Partnership Project; Technical Specification Group Radio Access Network; Evolved Universal Terrestrial Radio Access (E-UTRA); Physical Channels and Modulation (Release 10)," February 2013.
[2] 3GPP TR 36.897 V13.0.0, "3rd Generation Partnership Project; Technical Specification Group Radio Access Network; Study on elevation beamforming/Full-Dimension (FD) Multiple Input Multiple Output (MIMO) for LTE (Release 13)," June 2015.
[3] Hyoungju Ji, Younsun Kim, Juho Lee, Eko Onggosanusi, Younghan Nam, Jianzhong Zhang, Byungju Lee, Byonghyo Shim, "Overview of Full-Dimension MIMO in LTE-Advanced Pro," https://arxiv.org/abs/1601.00019, August 2016.
[4] Cheng et al., "Two-dimensional Discrete Fourier Transform based Codebook for Elevation Beamforming," United States Patent Application, US2016/0173180 A1, June 2016.
[5] Gerd Sommerkorn, Dirk Hampicke, Ralf Klukas, Andreas Richter, Axel Schneider, Reiner Thoma "Uniform Rectangular Antenna Array Design and Calibration Issues for 2-D ESPRIT Application," European Personal and Mobile Communications Conference, February 2001.
[6] Florian Roemer, Mohamed Ibrahim, Roman Alieiev, Markus Landmann, Reiner S. Thoma, and Giovanni Del Galdo, "Polarimetric Compressive Sensing Based DOA Estimation," Workshop on Smart Antennas, March 2014.
[7] M. Landmann, and R. Thoma, "Common Pitfalls in Multidimensional High Resolution Channel Parameter Estimation", IEEE Digital Signal Processing Workshop, September 2009.
[8] Erik Dahlman, Stefan Parkvall, Johan Skold, "4G: LTE/LTE-Advanced for Mobile Broadband," Academic Press, 2011. (ISBN:012385489X 9780123854896)
[9] Andreas Richter, "Estimation of Radio Channel Parameters: Models and Algorithms," Doctoral thesis, Verlag ISLE, 2005. (ISBN: 3-938843-02-0.

The invention claimed is:
1. A transmitter, comprising:
an antenna array comprising a plurality of antennas for a wireless communication with one or more receivers; and
a precoder connected to the antenna array, the precoder to apply a set of beamforming weights to the antenna array, the set of beamforming weights selected from a codebook to form by the antenna array one or more transmit/receive beams or nulls pointing in selected directions;
wherein the codebook comprises a plurality of sets of beamforming weights for a plurality of directions,
wherein the beamforming weights in the codebook are based on a first antenna array response matrix, the first antenna array response matrix defined by a second antenna array response matrix and one or more transformation matrices,
wherein the first antenna array response matrix comprises, for a plurality of directions, first array response vectors of the antenna array, the second antenna array response matrix comprises, for one or more of the plurality of directions, second array response vectors of the antenna array, the second array response vectors determined using a model of the antenna array, and the one or more transformation matrices describing one or more characteristics of the antenna array,
wherein the one or more transformation matrices are based on the second antenna array response matrix and a measured antenna array response matrix comprising, for some or all of the plurality of directions, measured array response vectors determined from a measurement of the antenna array, and wherein the codebook is acquired from a first codebook modified using the one or more transformation matrices, the first codebook defined using the second antenna array response matrix.

2. The transmitter of claim 1, wherein
the model of the antenna array is based on identical, omnidirectional antennas with ideal antenna placement, no electromagnetic coupling between the antennas or other practical imperfections in the array circuitry or the antennas, and
the one or more transformation matrices consider the directional and non-identical nature of the antennas in the antenna array, electromagnetic coupling between the antennas and other practical imperfections in the antenna array.

3. The transmitter of claim 1, wherein
the antenna array comprises a 1-dimensional antenna array, or a 2-dimensional antenna array or a 3-dimensional antenna array,
the 2-dimensional antenna array or the 3-dimensional antenna array controls the radio wave for beamforming both in the vertical or elevation direction and the horizontal or azimuth direction, and
the precoder comprises a dual-stage structure, the first stage comprising the sets of beamforming weights based on the codebook to be applied to each antenna of the antenna array, the second stage comprising coefficients that select and/or linearly combine the beams defined by the first stage to acquire a desired beam pattern.

4. The transmitter of claim 1, wherein
the first antenna array response matrix is linearly modeled/transformed using the second antenna array response matrix and the one or more transformation matrices.

5. The transmitter of claim 4, wherein
linearly modeling the first antenna array response matrix comprises using a further matrix, the further matrix to transform the response of omnidirectional antennas of the antenna array for a specific direction to a directional response of measured antennas of the antenna array.

6. The transmitter of claim 4, wherein
the second antenna array response matrix is defined by a 2D-DFT based matrix.

7. The transmitter of claim 1, wherein
the one or more transformation matrices are smaller in size than the first antenna array response matrix.

8. The transmitter of claim 1, wherein
a single transformation matrix is applied to the entire angular space and/or the entire frequency space of the antenna array, the angular space defined by azimuth and elevation angles, or
the angular space and/or the frequency space is partitioned into a plurality of smaller overlapping or non-overlapping partitions, the angular space defined by azimuth and elevation angles, wherein for each partition of the angular space and/or the frequency space the first antenna array response matrix for the partition is linearly modeled using the second antenna array response matrix for the partition and a transformation matrix for the partition.

9. The transmitter of claim 8, wherein
the angular space is partitioned into a plurality of smaller overlapping or non-overlapping partitions to achieve predefined targets for the accuracy of modeling/transforming of the first antenna array response matrix.

10. The transmitter of claim 8, wherein
the antenna array comprises a 2-dimensional antenna array or a 3-dimensional antenna array,
the transformation matrix for a particular partition of the angular space and/or the frequency space is expressed as a Kronecker product of a first matrix and a second matrix, and
the first matrix is the transformation matrix of the antenna array considering the antenna ports along a first dimension of the antenna array, and the second matrix is the transformation matrix corresponding to the antenna ports in the antenna array along a second dimension perpendicular to the first dimension.

11. The transmitter of claim 1, wherein
the transmitter is configured to compress the one or more transformation matrices by projecting it/them on a basis where the one or more transformation matrices are known to be compressible so as to acquire a first set of coefficients with a first magnitude, and a second set of coefficients with a second magnitude, the first magnitude being higher than the second magnitude, and
the first set of coefficients constitute the compressed form of the one or more transformation matrices.

12. The transmitter of claim 1, wherein
the first antenna array response matrix comprises a first antenna array response submatrix and a second antenna array response submatrix,
the first submatrix comprises, for a plurality of directions, the array response vectors of all antenna ports in the antenna array with respect to the horizontal polarization of an wavefront, and
the second submatrix comprises, for the same directions as in the first submatrix, the array of response vectors of all antenna ports in the antenna array to the vertical polarization of the wavefront.

13. The transmitter of claim 12, comprising:
a first transformation matrix corresponding to the horizontal polarization, the first submatrix acquired by linear modeling the second antenna array response matrix using the first transformation matrix, and
a second transformation matrix corresponding to the vertical polarization, the second submatrix acquired by linear modeling the second antenna array response matrix using the second transformation matrix.

14. The transmitter of claim 13, wherein
the codebook comprises a polarimetric codebook, the polarimetric codebook comprising a first sub-codebook and a second sub-codebook, wherein
the first sub-codebook comprises beamforming weights for all antenna ports with respect to the horizontal polarization, the beamforming weights acquired from a first codebook modified using the first transformation matrix, and
the second sub-codebook comprises beamforming weights for all antenna ports with respect to the vertical polarization, the beamforming weights acquired from the first codebook modified using the second transformation matrix.

15. The transmitter of claim 1, wherein the transmitter is configured to transmit the one or more transformation matrices to the one or more receivers as part of control information for the receiver.

16. A receiver, comprising:
an antenna for a wireless communication with a transmitter; and
a signal processor to receive and process a radio signal received at the antenna via a radio channel;

wherein the receiver is configured to store and/or calculate a codebook comprising a plurality of sets of beamforming weights for a plurality of directions, wherein the beamforming weights in the codebook are based on a first antenna array response matrix of an antenna array of the transmitter, the first antenna array response matrix comprising first array response vectors for a plurality of directions, the first array response vectors determined using a model of the antenna array of the transmitter, and the transmitter selecting a set of beamforming weights from the codebook to form by the antenna array a transmit/receive beam pointing in a selected direction, wherein the receiver is configured to modify the codebook using one or more transformation matrices received from the transmitter, wherein the one or more transformation matrices describe one or more characteristics of the antenna array of the transmitter, and wherein the one or more transformation matrices are based on the second antenna array response matrix and a measured antenna array response matrix comprising, for some or all of the plurality of directions, measured array response vectors determined from a measurement of the antenna array of the transmitter.

17. The receiver of claim 16, wherein the receiver is configured for a wireless communication with a transmitter, the transmitter comprising:

an antenna array comprising a plurality of antennas for a wireless communication with one or more receivers; and a precoder connected to the antenna array, the precoder to apply a set of beamforming weights to the antenna array, the set of beamforming weights selected from a codebook to form by the antenna array one or more transmit/receive beams or nulls pointing in selected directions;

wherein the codebook comprises a plurality of sets of beamforming weights for a plurality of directions, wherein the beamforming weights in the codebook are based on a first antenna array response matrix, the first antenna array response matrix defined by a second antenna array response matrix and one or more transformation matrices, wherein the first antenna array response matrix comprises, for a plurality of directions, first array response vectors of the antenna array, the second antenna array response matrix comprises, for one or more of the plurality of directions, second array response vectors of the antenna array, the second array response vectors determined using a model of the antenna array, and the one or more transformation matrices describing one or more characteristics of the antenna array, wherein the one or more transformation matrices are based on the second antenna array response matrix and a measured antenna array response matrix comprising, for some or all of the plurality of directions, measured array response vectors determined from a measurement of the antenna array, and wherein the codebook is acquired from a first codebook modified using the one or more transformation matrices, the first codebook defined using the second antenna array response matrix.

18. The receiver of claim 16, comprising:

a channel estimator to estimate a state of the radio channel, wherein the receiver is configured to determine, based on the radio channel estimation and the modified codebook, a feedback to the transmitter, the transmitter selecting, on the basis of the feedback, a set of beamforming weights from the codebook to form the transmit/receive beam, and wherein the feedback comprises control signals on the basis of which the transmitter selects a set of beamforming weights, or the feedback transmits a set of beamforming weights from the receiver to the transmitter.

19. A wireless communication network, comprising:

a transmitter of claim 1; and one or more receivers, comprising:

an antenna for a wireless communication with a transmitter; and a signal processor to receive and process a radio signal received at the antenna via a radio channel;

wherein the receiver is configured to store and/or calculate a codebook comprising a plurality of sets of beamforming weights for a plurality of directions, wherein the beamforming weights in the codebook are based on a first antenna array response matrix of an antenna array of the transmitter, the first antenna array response matrix comprising first array response vectors for a plurality of directions, the first array response vectors determined using a model of the antenna array of the transmitter, and the transmitter selecting a set of beamforming weights from the codebook to form by the antenna array a transmit/receive beam pointing in a selected direction, wherein the receiver is configured to modify the codebook using one or more transformation matrices received from the transmitter, wherein the one or more transformation matrices describe one or more characteristics of the antenna array of the transmitter, and wherein the one or more transformation matrices are based on the second antenna array response matrix and a measured antenna array response matrix comprising, for some or all of the plurality of directions, measured array response vectors determined from a measurement of the antenna array of the transmitter.

20. The wireless communication network of claim 19, wherein the transmitter comprises a base station serving a user equipment, or a user equipment served by a base station, or the receiver comprises a base station serving a user equipment, or a user equipment served by a base station.

21. A method, comprising:

modifying a codebook used by a precoder of a transmitter, the transmitter comprising an antenna array comprising a plurality of antennas for a wireless communication with one or more receivers, and the precoder connected to the antenna array, wherein the codebook comprises a plurality of sets of beamforming weights for a plurality of directions, the beamforming weights in the codebook based on a first antenna array response matrix, the first antenna array response matrix comprises, for a plurality of directions, first array response vectors determined using a model of the antenna array, and wherein the codebook is modified using one or more transformation matrices, the one or more transformation matrices describing one or more characteristics of the antenna array, and wherein the one or more transformation matrices are based on the second antenna array response matrix and a measured antenna array response matrix comprising, for some or all of the plurality of directions, measured array response vectors determined from a measurement of the antenna array of the transmitter.

22. A method, comprising:

receiving and processing, at a receiver comprising an antenna for a wireless communication with a transmitter, a radio signal received at the antenna via a radio channel, the radio signal comprising one or more transformation matrices; and modifying, using the one or more transformation matrices, a codebook stored or calculated at the receiver and comprising a plurality of sets of beamforming weights for a plurality of directions, the beamforming weights in the codebook being based on a first antenna array response matrix of an antenna array of the transmitter, the first antenna array response matrix comprising first array response vectors for a plurality of directions, the first array response vectors determined using a model of the antenna array of the transmitter, and the transmitter selecting a set of beamforming weights from the codebook to form by an antenna array a transmit/receive beam pointing in a selected direction, wherein the one or more transformation matrices describe one or more characteristics of the antenna array of the transmitter, and wherein the one or more transformation matrices are based on the second antenna array response matrix and a measured antenna array response matrix comprising, for some or all of the plurality of directions, measured array response vectors determined from a measurement of the antenna array of the transmitter.

23. A non-transitory digital storage medium having a computer program stored thereon to perform the method, comprising:

modifying a codebook used by a precoder of a transmitter, the transmitter comprising an antenna array comprising a plurality of antennas for a wireless communication with one or more receivers, and the precoder connected to the antenna array, wherein the codebook comprises a plurality of sets of beamforming weights for a plurality of directions, the beamforming weights in the codebook based on a first antenna array response matrix, the first antenna array response matrix comprises, for a plurality of directions, first array response vectors determined using a model of the antenna array, and wherein the codebook is modified using one or more transformation matrices, the one or more transformation matrices describing one or more characteristics of the antenna array, and wherein the one or more transformation matrices are based on the second antenna array response matrix and a measured antenna array response matrix comprising, for some or all of the plurality of directions, measured array response vectors determined from a measurement of the antenna array of the transmitter, when said computer program is run by a computer.

24. A non-transitory digital storage medium having a computer program stored thereon to perform the method, comprising:

receiving and processing, at a receiver comprising an antenna for a wireless communication with a transmitter, a radio signal received at the antenna via a radio channel, the radio signal comprising one or more transformation matrices; and modifying, using the one or more transformation matrices, a codebook stored or calculated at the receiver and comprising a plurality of sets of beamforming weights for a plurality of directions, the beamforming weights in the codebook being based on a first antenna array response matrix of an antenna array of the transmitter, the first antenna array response matrix comprising first array response vectors for a plurality of directions, the first array response vectors determined using a model of the antenna array of the transmitter, and the transmitter selecting a set of beamforming weights from the codebook to form by an antenna array a transmit/receive beam pointing in a selected direction, wherein the one or more transformation matrices describe one or more characteristics of the antenna array of the transmitter, and wherein the one or more transformation matrices are based on the second antenna array response matrix and a measured antenna array response matrix comprising, for some or all of the plurality of directions, measured array response vectors determined from a measurement of the antenna array of the transmitter, when said computer program is run by a computer.

* * * * *